(12) United States Patent
Lurie et al.

(10) Patent No.: US 9,481,375 B2
(45) Date of Patent: Nov. 1, 2016

(54) METHOD AND APPARATUS TO ADJUST FOR UNDESIRED FORCE INFLUENCING A VEHICLE INPUT CONTROL

(75) Inventors: Marc Lurie, Lafayette, CA (US); Attila Vass, Foster City, CA (US)

(73) Assignee: Pedal Logic LP, Lafayette, CA (US)

( * ) Notice: Subject to any disclaimer, the term of this patent is extended or adjusted under 35 U.S.C. 154(b) by 984 days.

(21) Appl. No.: 13/286,849

(22) Filed: Nov. 1, 2011

(65) Prior Publication Data

US 2012/0143392 A1 Jun. 7, 2012

Related U.S. Application Data

(60) Provisional application No. 61/419,411, filed on Dec. 3, 2010, provisional application No. 61/423,082, filed on Dec. 14, 2010, provisional application No. 61/477,023, filed on Apr. 19, 2011.

(51) Int. Cl.
    G05D 1/00    (2006.01)
    B60W 50/10   (2012.01)
    B64C 13/04   (2006.01)

(52) U.S. Cl.
    CPC .............. *B60W 50/10* (2013.01); *B64C 13/04* (2013.01); *B60W 2520/105* (2013.01); *B60W 2540/10* (2013.01); *B60W 2540/106* (2013.01)

(58) Field of Classification Search
    None
    See application file for complete search history.

(56) References Cited

U.S. PATENT DOCUMENTS

| | | | | |
|---|---|---|---|---|
| 5,775,293 | A | * | 7/1998 | Kresse .......................... 123/396 |
| 8,260,521 | B2 | | 9/2012 | Sato |
| 2003/0040859 | A1 | * | 2/2003 | Farmer ........................... 701/45 |
| 2003/0191568 | A1 | | 10/2003 | Breed |
| 2003/0193766 | A1 | * | 10/2003 | Mantik ........................... 361/92 |
| 2005/0049773 | A1 | * | 3/2005 | Kitapini et al. ................. 701/70 |
| 2007/0038403 | A1 | * | 2/2007 | Barthel et al. ................ 702/117 |
| 2008/0047770 | A1 | | 2/2008 | Breed et al. |
| 2008/0147253 | A1 | * | 6/2008 | Breed ............................... 701/3 |
| 2008/0172155 | A1 | * | 7/2008 | Takamatsu et al. ............ 701/40 |
| 2009/0127015 | A1 | * | 5/2009 | Van Saanen ................... 180/271 |
| 2009/0299569 | A1 | * | 12/2009 | Knoll et al. ..................... 701/36 |
| 2010/0198456 | A1 | * | 8/2010 | Komori et al. ................. 701/35 |
| 2010/0274435 | A1 | * | 10/2010 | Kondoh et al. ................. 701/29 |
| 2010/0318254 | A1 | * | 12/2010 | Yamamura et al. ............ 701/29 |
| 2011/0246021 | A1 | * | 10/2011 | Prokhorov ...................... 701/36 |
| 2011/0266396 | A1 | * | 11/2011 | Abildgaard et al. .......... 244/223 |
| 2012/0055279 | A1 | * | 3/2012 | Van Saanen .................... 74/513 |

OTHER PUBLICATIONS

International Search Report dated Apr. 3, 2012, International Application No. PCT/US2011/62849, International Filing Date Dec. 1, 2011, Applicant: Lurie, Marc, 11 pages.

\* cited by examiner

*Primary Examiner* — Mussa A Shaawat
*Assistant Examiner* — Abdhesh Jha
(74) *Attorney, Agent, or Firm* — K&L Gates LLP

(57) ABSTRACT

An input control signal is adjusted to account for a portion of the input control signal that may be attributable to unintended forces. Such unintended forces may include, but are not limited to, one or more of operator initiated unintended forces, vehicle-generated unintended forces, and extra-vehicular unintended forces. The amount by which the input control signal is adjusted correlates to a determined probability. The probability is an indicator as to how likely the input control value is affected by unintended forces.

39 Claims, 24 Drawing Sheets

METHOD AND APPARATUS TO ADJUST FOR UNDESIRED FORCE INFLUENCING A VEHICLE INPUT CONTROL

RELATED APPLICATIONS

This application claims priority of U.S. provisional application Ser. No. 61/419,411, filed Dec. 3, 2010, and entitled "SYSTEM AND METHOD FOR IMPROVING THE FUEL ECONOMY AND ENERGY EFFICIENCY OF MOVING VEHICLES", U.S. provisional application Ser. No. 61/423,082, filed Dec. 14, 2010, and entitled "SYSTEM AND METHOD FOR IMPROVING THE FUEL ECONOMY AND ENERGY EFFICIENCY OF MOVING VEHICLES", and U.S. provisional application Ser. No. 61/477,023, filed Apr. 19, 2011, and entitled "SYSTEM AND METHOD FOR IMPROVING THE FUEL ECONOMY AND ENERGY EFFICIENCY OF MOVING VEHICLES." This application incorporates U.S. provisional application Ser. Nos. 61/419,411, 61/423,082, and 61/477,023 in their entireties by reference.

FIELD OF THE INVENTION

The present subject matter relates generally to controlling vehicles, and more particularly to adjusting for the influence of undesired force on an input control.

BACKGROUND OF THE INVENTION

In addition to desired force applied by a vehicle operator, an input control for a vehicle, such as an accelerator pedal, is subject to, and may be influenced by, one or more undesired forces from a variety of sources. Such forces may include, but are not limited to, extra-vehicular inertial forces, such as inertial forces encountered when a vehicle traverses a pathway obstacle such as a bump or dip, and intra-vehicle forces, such as vibrations generated by other parts of the vehicle, such as a wheel out of balance. Such forces may also include forces unintentionally generated by the operator due to, for example, muscle fatigue, inattention, or poor driving habits.

As well as a potential generator of undesired force, a vehicle operator may also be affected by one or more such forces, particularly extra-vehicular and vehicle-generated forces. Individually or in combination such forces may undesirably influence an operator's application of force to an input control, such as an accelerator pedal. Moreover, the effects of such forces on an operator may lag slightly behind the effect on the input control, which in turn may generate independent, desynchronized motions between an operator and an input control.

Due to the influence of such undesired forces individually and in combination, an input control may depart from a desired state or, alternately, fail to approach a desired state in the manner intended by the vehicle operator. For example, an operator may unintentionally apply pressure to an accelerator pedal when a land vehicle encounters a bump on a pathway. In another example, an operator of a high-torque land vehicle under load, such as a tractor, may unintentionally change a force applied to an accelerator pedal when experiencing "power hop," a type of dynamic instability characterized by "porpoising"-like forward motion. In yet another example, an operator of a tractor may unintentionally change a force applied to an accelerator pedal when experiencing road lope, which includes a vehicle vibration caused at least in part by out-of-round tires rolling at a speed that generates a rotational input frequency at or near a vehicle harmonic.

Several approaches have been employed to mitigate or reduce unintentional inputs and/or their effects:

U.S. Pat. No. 5,775,293, assigned to Cummins Engine Co., Inc. relates to a lag filter, which has the effect of filtering small changes in throttle input, while allowing large changes. However, indiscriminately filtering all small changes does not distinguish between intentional and unintentional small changes.

U.S. Pat. No. 6,589,135, assigned to Deere & Company relates to managing fuel flow using an on-board accelerometer to reduce bouncing of a vehicle due to road lope. Issues related to on and off road conditions, as well as unintentional forces generated by the operator are not addressed.

U.S. Pat. No. 7,720,583, assigned to Toyota Jidosha Kabushiki Kaisha and Denso Corporation, relates to setting a target driving force based on at least one of instructions from a driver and from a second processor and correcting the target driving force to suppress vibration on a spring of the vehicle. Correcting the target driving force does not however account for the effects of such forces on an operator, and the resulting unintentional forces generated by the operator.

U.S. Patent Publication No. 2011/0022286A1, assigned to Honda Motor Co., LTD., references an engine control unit that corrects an output signal of an accelerator pedal that governs the output of the engine according to detected vertical acceleration of the vehicle so that the unintended change in the output of the engine which is caused by an external force applied to the accelerator pedal and may cause an unintended acceleration or deceleration of the engine can be canceled. However, the engine control unit is only enabled when in an economy mode of operation. For other modes of operation, the responsiveness and performance are negatively impacted by enabling the engine control unit, and it is therefore disabled.

SUMMARY OF THE INVENTION

A problem to be solved may include dyssynchrony between the desired state and actual state of an operator input control for a vehicle, resulting at least in part from one or more extra-vehicular, vehicle-generated, or operator-generated forces unintentionally influencing one or both of an operator and an input control.

The present subject matter may provide a solution to mitigate or eliminate these effects, such as by providing an adjusted input control signal that accounts for an operator's unintentional reaction to an undesired force.

An input control signal is adjusted to account for a portion of the input control signal that may be attributable to unintended forces. Such unintended forces may include, but are not limited to, one or more of operator initiated unintended forces, vehicle-generated unintended forces, and extra-vehicular unintended forces. The amount by which the input control signal is adjusted correlates to a determined probability. The probability is an indicator as to how likely the input control value is affected by unintended forces.

Other features and advantages of the present invention will become apparent after reviewing the detailed description of the embodiments set forth below.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE PRESENT INVENTION

Figure 1:
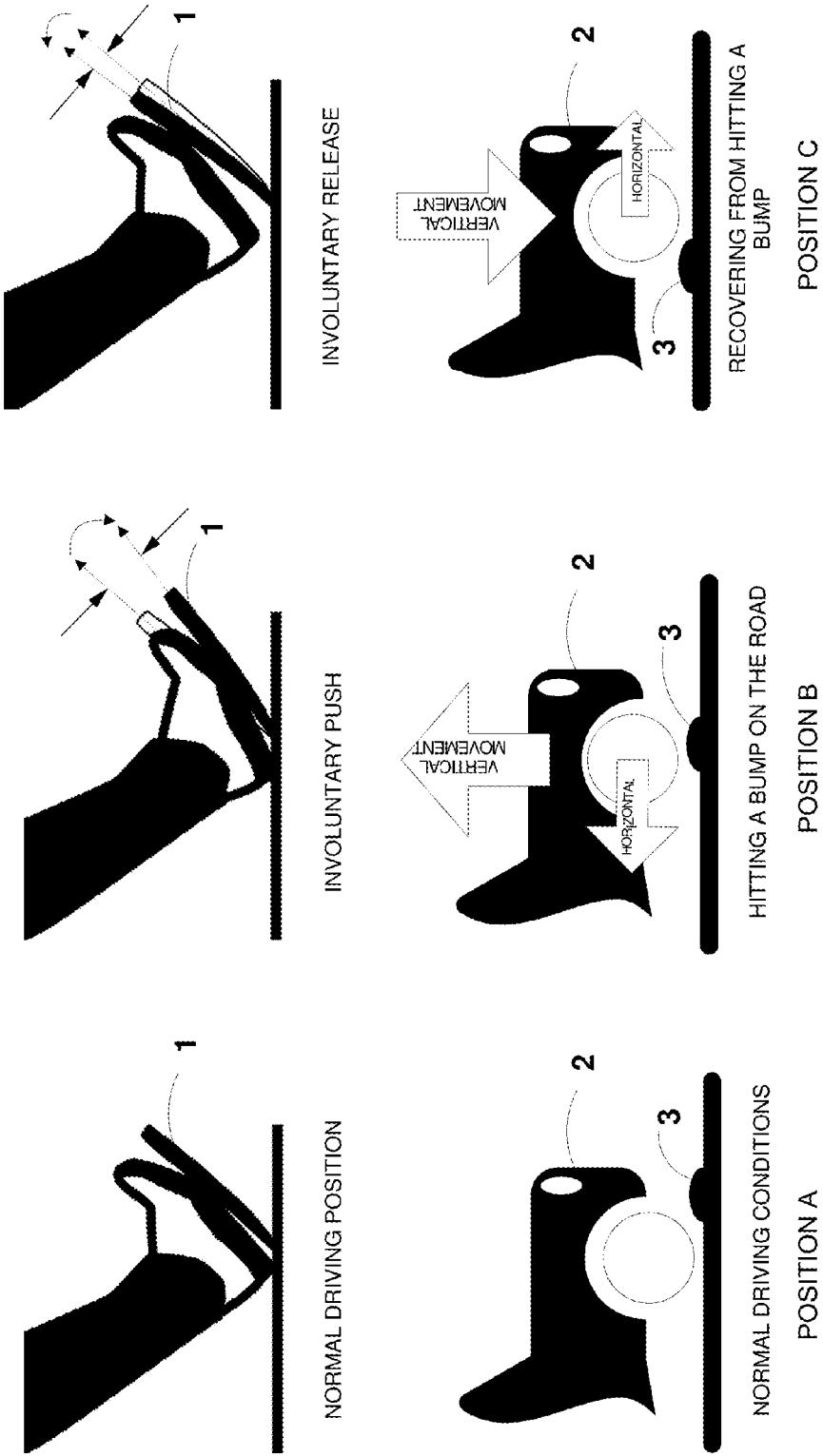
FIG. 1 illustrates conventional effect on an accelerator input.

Embodiments of the present application are directed to a vehicle input control system. Those of ordinary skill in the art will realize that the following detailed description of the vehicle input control system is illustrative only and is not intended to be in any way limiting. Other embodiments of the vehicle input control system will readily suggest themselves to such skilled persons having the benefit of this disclosure.

Reference will now be made in detail to implementations of the vehicle input control system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In addition to desired force applied by a vehicle operator, the position and operation of an input control, such as an accelerator pedal, may be influenced by, one or more undesired forces from a variety of sources. Such forces may include extra-vehicular and vehicle-generated forces, as well as other non-volitional operator-generated forces, individually and collectively referred to as "undesired forces".

In an example, undesirable extra-vehicular forces include, but are not limited to, forces imparted upon a vehicle including, but not limited to, inertial forces encountered when a vehicle traverses a pathway obstacle such as bumps, dips, water such as standing water or rain, wind forces, and other forces external to the vehicle. In an example, undesirable vehicle-generated forces include, but are not limited to, forces caused by vehicle movements. Vehicle movements include, but are not limited to, vibrations of the vehicle, such as at harmonic resonances, ballast shifting, actuation or deactivation of subsystems such as pumps or motors, and other movements. In an example, undesirable operator-generated forces include forces made by the operator, such as muscle movement due to pulse, twitches, muscle fatigue and the like.

As well as a potential generator of undesired forces, a vehicle operator may also be affected by one or more undesired forces, particularly undesirable extra-vehicular and undesirable vehicle-generated forces. Individually or in combination such undesirable forces may undesirably influence an operator's application of force to an input control. Moreover, the effects of such undesirable forces on an operator may lag behind the effect on the input control, which in turn may generate independent, desynchronized motions between an operator and an input control.

Due to the influence of such undesired forces individually and in combination, such input control may depart from a desired state or, alternately, fail to approach a desired state in the manner intended by the operator.

FIG. 1 illustrates an exemplary vehicle-operator interaction showing unintentional applications of force upon an input control, such as an accelerator pedal 1, when a forward-moving vehicle 2 encounters a bump 3 in a pathway. The three images in the bottom row of FIG. 1 depict the vehicle and its general response to an encountered bump. The image directly above each of those shows the general influence that the motion of the vehicle has on the operator's foot and the accelerator pedal.

In FIG. 1, the initial state is shown in Position "A". The top image depicts the vehicle operator's foot in contact with an accelerator pedal. The bottom image is the position of the front axel of the vehicle 2 relative to the bump 3 on a pathway.

In Position "B", the vehicle 2 begins to traverse the bump 3. As the vehicle 2 approaches the apex of the bump 3 in the bottom image, the vehicle 2 as a whole, including the input control 1, may experience inertial forces that may move it upward and slightly backward relative to the pathway and the vehicle operator due to the temporarily increased forward resistance. Due to the movement of the vehicle 2, the operator may compress into the driver's seat and, as shown in the top image of the example, the operator's foot may unintentionally move downward and forward relative to the vehicle 2, which may result in an unintentional temporary increase in force on the accelerator pedal 1, such as by 1%-4% in an example.

In Position "C", the vehicle 2 completes its traversal, dropping down the backside of the bump 3 as shown in the bottom image. In the top image, the vehicle 2 and the accelerator pedal 1 may in essence fall away from the operator's foot, which may cause an unintentional temporary decrease in force applied to the accelerator pedal 1.

In an example, after passing an obstacle, such as illustrated in Positions B and C, the land vehicle may rebound one or more times, such as on a suspension. Such rebounds may result in unintentional adjustments, generally diminishing in amplitude, of the accelerator pedal prior to returning to a desired steady-state. In an example, wave-like vibratory behaviors of the vehicle may be adjusted for by the vehicle input control system and method of providing an adjusted input control signal. One example of a vibratory behavior includes a front portion of the vehicle moving up while a rear portion moves down. When a vehicle encounters a dip in the road, a reciprocal set of changes in force and relative position may occur. Other behaviors are possible.

In some instances, a portion of the operator's body utilizing an input control temporarily lags behind the vehicle or input control itself in reaching a steady or desired state, and vice versa. This lag may occur over a range of delay, such as between 50 ms and 250 ms for an operator utilizing an accelerator pedal, in an example. During these episodes, which may be frequent, happening at 10 Hz or higher, or even 50 Hz or higher, an operator may apply unintentional and mistimed changes in force to an input control, such as an accelerator pedal, that in turn may increase or decrease the requested power output of the vehicle for a fraction of a second, in an example. Some examples, on average, experience a 1-4% unintentional adjustment to the accelerator pedal position within 100 ms of the vehicle encountering an obstacle such as a bump or dip.

In some instances the duration and degree of dyssynchrony between the desired state and actual state of an operator input control for a vehicle may not be uniform and can vary depending upon a number of factors. Examples of such factors include, but are not limited to, the size, shape, and other characteristics of obstacles in the pathway; the physical characteristics and condition of the vehicle (e.g., maintenance level, presences of aftermarket parts that modify performance), including the vehicle's suspension, powertrain, and cargo; and the reflexes, physical condition, size, shape, position, training, and alertness of the operator.

The length, degree and/or frequency of episodes varies. Some episodes can be observed and may be adjusted for in whole or in part by a vehicle operator. In other episodes, an operator may find it difficult to maintain or achieve a desired input state. In some instances, this difficulty arises when an operator is unable to observe or recognize such episodes and/or unable to react in time to adjust. In an example, an operator of a land vehicle unintentional adjusts an accelerator pedal within 250 ms of such vehicle encountering an obstacle on a pathway.

In an example, unintentional adjustments by an operator to an input control, such as an accelerator pedal, may lead to an undesired increase in energy consumption by a vehicle before it reaches, or returns to, a desired operating state. The amount of energy, such as fuel or electrical power, applied or misapplied during each unintentional input may be minute and involve a small change in applied power over a fraction of a second. However, due to various sources of loss in the system, including but not limited to changes in resistance and other forces as a vehicle accelerates and decelerates, energy losses from unintended accelerations may not be fully offset by "gains" from unintentional decelerations, in an example. In an example, even though a system may return to a desired operational state after a brief period of reciprocating accelerations and decelerations, which may be measured in milliseconds, the energy losses from the unintended accelerations typically will be greater than the savings from the corresponding unintended decelerations.

Because operator's may struggle to maintain or achieve a desired operating slate for an input control, there is a need for systems and methods to reduce or eliminate unintentional adjustments to the operational state arising from the influence of undesired force on one or both of an operator and vehicle. There is a need to provide such a solution in original equipment and aftermarket variations for both industrialized and emerging economies.

The present subject matter provides systems and methods that reduce or eliminate the dyssynchrony between the actual and desired operating state of an input control for a vehicle. The present subject matter extends to various vehicles including, but not limited to, land vehicles such as over-the-road vehicles and off-road vehicles, as well as sea vehicles and air vehicles. Pathways contemplated include, but are not limited to, roadways, waterways, and flight pathways. Vehicles on roadways may be affected by obstacles such as potholes or grooves in a surface, in an example. Vehicles on waterways may be affected by waves and wind, in an example. Vehicles in flight may be affected by air turbulence, in an example.

The present subject matter is not limited to the sequence of bumps and dips illustrated, and extends to other events that impart undesired force upon the vehicle. An example includes "slow" vibrations, such as variations in force on an accelerator pedal that may occur as a vehicle traverses rolling hills, where the detected undesired force may be attributable to operator inattention to changes in pressure rather than to extra-vehicular or vehicle-generated forces. The present subject matter is not limited to examples in which an accelerator input is unintentionally adjusted, and extends to unintentional adjustment of other controls including, but not limited to, braking input and directional inputs, such as a steering wheel in a land vehicle or a yoke in an aircraft.

Figure 2A:
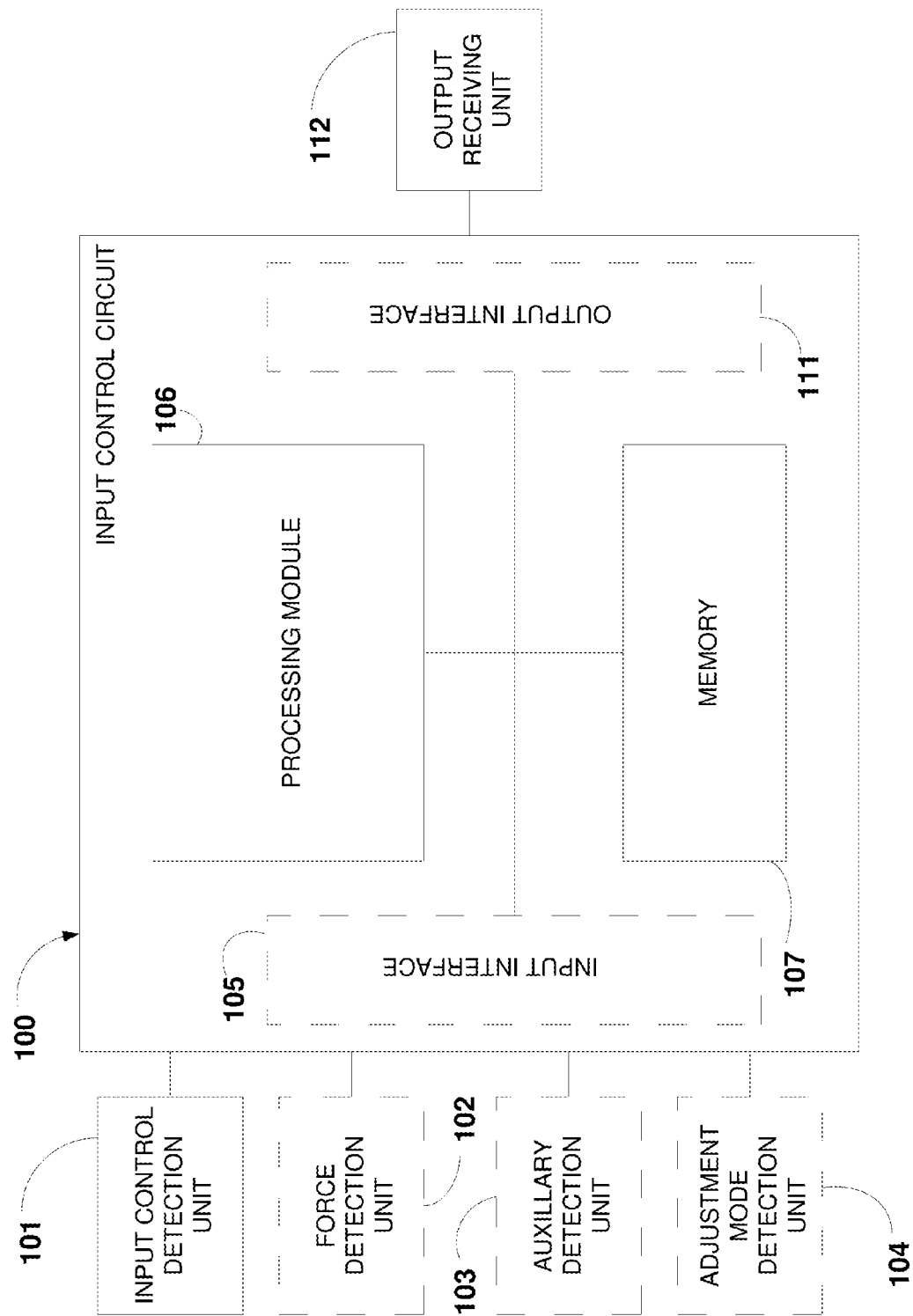
FIG. 2A illustrates a functional block diagram of an input control system according to an embodiment.

FIG. 2A illustrates a functional block diagram of an input control system according to an embodiment. In the illustrated embodiment, an input control circuit 100 is coupled to at least one input control detection unit 101 and at least one output receiving unit 112. In some embodiments, the input control circuit 100 is also coupled with one or more force detection units 102, auxiliary detection units 103, and/or mode detection units 104. Detection units, such as detection units 101-104, and the output receiving unit 112 can be coupled to communicate directly or via a signal communicated from another component, such as a carrier signal, with the input control circuit 100 and the various components of the input control circuit 100, such as components 105-111, as described hereafter. The input control circuit 100, the detection units 101-104, and the output receiving unit 112 may operate in real-time, near real-time, or batch modes. In an example, the input control circuit 100 may analyze a batch file of signal values received from a storage medium.

The input control circuit 100 is configured to provide an adjusted input control signal, such as by implementing the method for providing an adjusted input control signal described in FIGS. 8-23 detailed below. The adjusted input control signal accounts for an operator's failure to react or unintended reaction attributable to undesired forces influencing an input control signal. In some embodiments, the input control circuit 100 is configured to analyze input control signals, and in some configurations additional input signals provided by one or more detection units, and determine a probability that the input control signal has a portion attributable to the unintended operator reaction. The probability is referred to as a confidence level value. In some embodiments, historical input control values and/or known waveforms are used to determine the confidence level. The input control circuit 100 is further configured to determine a candidate adjustment value to subsequently be used to adjust the input control signal, and to determine an adjusted input control value using the input control signal and the candidate adjustment value. The portion of the input control signal attributable to the operator's unintended reaction can include, but is not limited to, instantaneous information and recent information collected in real-time or near real-time. In an example, the adjusted input control signal may be substantially similar or identical to the input control signal.

In some embodiments, an input control detection unit 101 is configured to provide an input control signal, derived in whole or in part from sensing electronics, that indicates one or both of the operating state of, or adjustment to, at least one input control. In an example, an input control detection unit 101 is a Hall-effect sensor attached to an accelerator pedal assembly in order to generate an input control signal indicating the accelerator pedal position. In another example, an input detection unit is a control wheel steering sensor in an aircraft.

In some embodiments, the input control circuit 100 is coupled to at least one force detection unit 102 configured to provide a force signal, derived in whole or in part from one or both electronics, such as sensing electronics, that sense the presence of one or more forces, or a storage medium that stores sensed force signals. Examples of force detection units include, but are not limited to, accelerometers, optical sensors, radar, acoustic sensors, and the like. Other vehicle systems, such as a suspension articulation system, can also provide a force signal, in an example. Force detection units can be used individually or in combination.

The location of a force detection unit 102 can affect the quality of a force signal provided to the input control circuit 100 by, among other things, reducing the influence of noise in the force signal. In some instances, the location can increase the ability of the input control circuit 100 to distinguish between noise and a valid force signal. The proper location for a force detection unit 102 in a particular vehicle can be affected by a number of factors, including, but not limited to, the characteristics of the vehicle, the type and location of the input control detection unit 101, and the type of force sought to be detected.

In some embodiments, the force detection unit 102 in a vehicle can be coupled to, and communicate with, at least one system or storage medium configured to provide a signal indicative of forces detected ahead of such vehicle, such as topographical and/or other environmental information. In an example, such system or storage medium can store and/or analyze data acquired by one or both of the same vehicle or other vehicles in previous journeys over the same pathway. In an example, such system or database is located on a network, which can be wired or wireless. In an example, such system or storage medium is located in the same vehicle as the force detection unit 102. In an example, such system or storage medium is located in another vehicle traveling ahead along the same pathway. In an example, such system or storage medium is located in one or more remote facilities.

In some embodiments, the force detection unit 102 can communicate a force signal indicating the presence of one or more forces to at least one system or storage medium configured to receive information generated by one or more vehicles traveling a pathway. In an example, a force detection unit 102 can communicate data indicating the topographical conditions of a pathway to a system or storage medium. In an example, such systems or storage mediums can one or both store and analyze topographical, environmental and other data received from one or more vehicles in order to make adjustments. In an example, such system or storage medium is located in another vehicle traveling near such vehicle along the same pathway. In an example, such system or storage medium is located in one or more remote facilities.

In some embodiments, the input control circuit 100 is coupled to at least one auxiliary detection unit 103 configured to provide a signal, derived in whole or in part from one or both sensing electronics or other electronics, that indicates one or both of the operating state of, or adjustment to, at least one system or component coupled or connected to the vehicle. In an example, an auxiliary detection unit 103 is configured to provide a signal representative of the vehicle speed. In another example, an auxiliary detection unit 103 signal indicates the geographical position, or geo-position, of the vehicle. In yet another example, an auxiliary detection unit 103 signal indicates activation by an operator of a weapon system in a military vehicle.

In an exemplary application, accumulated route data and adjusted input control values determined by the input control circuit can be used along with in-vehicle telematics in order to generate a map that associates specific fuel consumption levels and patterns with specific route segments, potentially down to the city block or even to the linear foot. In this manner, route planners, for example, can know exactly what the fuel cost is to run a specific bus on a specific route on a given time and day. Such information is very valuable to route planners.

In some embodiments, the input control circuit 100 includes at least one mode detection unit 104 configured to provide a mode signal, derived in whole or in part from one or both sensing electronics or other electronics, that indicates at least one requested operating mode of the input control circuit 100. In some embodiments, a mode detection unit 104 can provide a mode signal indicating one or both of at least one system-selected mode or at least one operator-selected mode. Example methods to implement both operator-selected modes and system-selected modes are described by the methods in FIGS. 9 through 11. Other approaches are also contemplated.

In some embodiments, a system-selected mode indicates one or more operating modes for the input control system requested by one or more other components or systems, which can be located on a network. In an example, the mode signal can indicate a desire by at least one other component or system to deactivate or modify adjustments due to at least one special conditions, such as internal diagnostic fault, vehicle accident, or entry into combat modes. In another example, the mode signal can indicate a request or direction to activate or deactivate a learning mode. In certain embodiments, the mode signal containing system-selected mode values is analyzed by the input control circuit 100, such as by the exemplary method in FIG. 11, described hereinafter.

In some embodiments, the mode detection unit 104 can provide a mode signal indicating at least one operator-selected mode, such as by monitoring the value or state of at least one input control manipulated by the vehicle operator. In an example, a vehicle operator can influence the aggressiveness with which the input control circuit 100 adjusts a signal from an input control detection unit 101, such as by adjusting a mode selection input, such as a mode switch, such as a Power/Normal/ECO mode switch 204.

In some embodiments, the output receiving unit 112 can be at least one other system, component, or storage medium configured to receive a signal that accounts for one or both of the input control signal and the adjusted input control signal. In an example, such signal can be provided by one or both of the input detection unit 101 and the input control circuit 100. In an example, such signal can be communicated directly or via a signal communicated from another component, such as a carrier signal.

In some embodiments, the output receiving unit 112 can include electronics configured to process and/or store such signal. In an example, the output receiving unit 112 can include one or more actuators that individually or in combination regulate the output force of a vehicle. In another example, the output receiving unit 112 can include a throttle body controller. In yet another example, the output receiving unit 112 can include a motor controller.

In some embodiments, the output receiving unit 112 can include a storage medium. In an example, the output receiving unit 112 can be located on a wired or wireless network. In an example, the output receiving unit 112 is located in the same vehicle as the input control circuit 100. In an example, the output receiving unit 112 can be located on a network extending from a first vehicle to one or more other vehicles traveling near such first vehicle on a pathway. In an example, the output receiving unit 112 can be located on a network, such as a storage medium located in one or more remote facilities.

In an example, the output receiving unit 112 receives the input control signal generated by the input control detection unit 101, such as when the input control circuit 100 is bypassed, such as due to power loss, deactivation by an operator or another system, or system fault and error handling, among other examples.

In some embodiments, the input control circuit 100 includes a processing module 106, a memory 107, an input interface 105, and an output interface 111 interconnected via a bus. Each of the components of the input control circuit 100 is coupled to communicate with one or more other components of the input control circuit 100 via a communication path, such as a data bus, a network link, or a memory location. In an example, the various components of the input control circuit 100, such as components 105-111, may be coupled to communicate with one or both of at least the output receiving unit 112 or one or more detections unit, such as detection units 101-104. In certain example, the various components of the input control circuit 100, such as components 105-111, can be coupled to communicate directly with one another or via a signal communicated from another component, such as a carrier signal.

In some embodiments, the input interface 105 is configured to receive one or more signals from various detection units 101-104 and to provide such signals to various components of the input control circuit 100. The input interface 105 is also configured to receive input signals from external communications, including remote systems and storage mediums. In certain examples, an input interface 105 can include an analog-to-digital converter for converting analog signals obtained from various inputs into corresponding digital signals suitable for use by the input control circuit 100. In an example, the input interface 105 can apply signal conditioning to a received signal. In an example, the input interface 105 can apply data validation to a received signal. In an example, the input interface 105 includes one or more communications pathways to communicate signals.

In some embodiments, the input interface 105 can synchronize signals received from two or more sources, such as the detection units 101-104, prior to providing such signals to various other components of the 100, such as components 106-111. In an example, such signals can be synchronized in a time domain. In an example, such signals can be synchronized in a value domain. In other embodiments, such signal synchronization can be performed instead by other components of the input control circuit 100, such as the processing module 106. In an example, the input interface 105 includes one or more communications pathways to communicate signals.

In some embodiments, the output interface 111 is coupled with the output receiving unit 112 and one or more of various components of the input control circuit 100, such as components 105-107, and one or more detection units 101-104. In an example, the output interface 111 communicates one or more signals with such components 105-107 and such detection units 101-104. In an example, the output interface 111 communicates such signals to an output receiving unit 112. The input interface 105 is also configured to provide output signals to external communications, including remote systems and storage mediums. In some embodiments, the output interface 111 can include a digital-to-analog converter for converting digital signals obtained from various inputs into corresponding analog signals suitable for use by the output receiving unit 112. The output interface 111 can apply signal conditioning to a received signal prior to providing such signal to the output receiving unit 112. In an example, the output interface 111 includes one or more communications pathways to communicate signals. Although the input interface 105 and the output interface 111 are shown as separate components in the exemplary FIG. 2A, it is understood that the input and output functionality can be integrated within a single input/output interface, as is well known in the art.

The processing module 106 can include one or more processing units that configured to perform the method of providing an adjusted input control value, such as by implementing the methods described in FIGS. 8-23 detailed below. The processing module 106 can operate in real-time, near real-time, or batch modes. In some embodiments, the processing module 106 is configured to communicate one, some, or all processed values to one or more other systems, components, or storage mediums, such as located on a wired or wireless network.

The memory 107 represents any conventional memory, cache, or register unit, including volatile or non-volatile memory, configured for storing data. Such data includes, but is not limited to, data used by the processing module 106 to perform the method of providing the adjusted input control value, or data generated by the processing module 106 while performing the method for providing the adjusted input control signal.

Figure 2B:
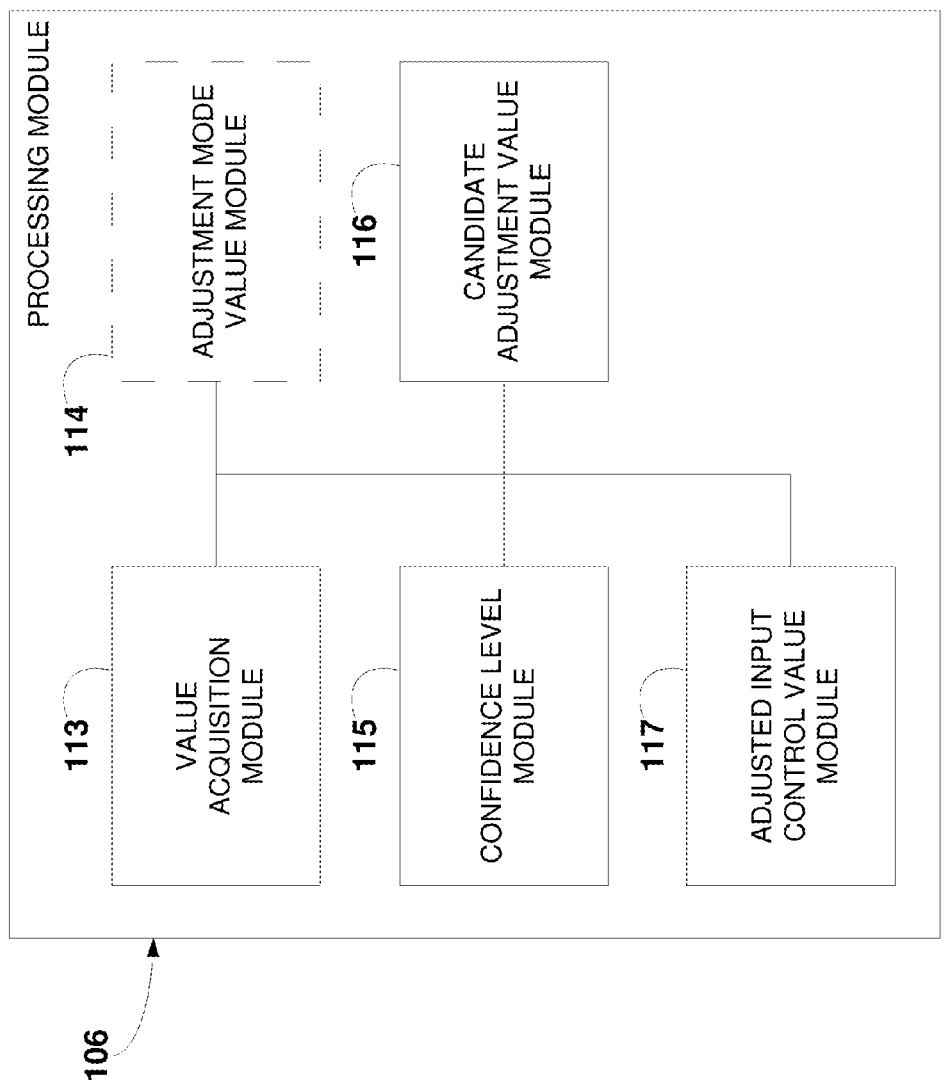
FIG. 2B illustrates a functional block diagram of the processing module of FIG. 2A.

In some embodiments, the processing module 106 includes an acquisition module 113, an adjustment mode value module 114, a confidence level module 115, a candidate adjustment value module 116, and an adjusted input control value module 117, as shown in FIG. 2B. The acquisition module 113 is configured to receive detection signals from one or more of the detection units 101-104. In those circumstances where detection signals are received from the input control detection unit 101 and at least one of the detection units 102-104, then the acquisition module 113 can also be configured to synchronize the input control signals input from the input detection unit 101 and the various detection signals received from the detection units 102-104. In some embodiments, configuring the acquisition module 113 to synchronize such signals is optional as the synchronization process can be performed by the input interface 105. In an example, the acquisition module 113 is configured to perform at least all, or part, of the method in step 803 of FIG. 8.

The adjustment mode value module 114 is configured to determine an adjustment mode value. In some embodiments, the adjustment mode value is used to determine a group of adjustment value blocks that indicate the aggressiveness with which the systems and methods disclosed one or both identify input control values for adjustment and make adjustments to such input control values. In other embodiments, the adjustment mode value is used to determine whether the system is activated or deactivated. In an example, the adjustment mode value module 114 is configured to perform at least all, or part, of the method in step 810 of FIG. 8.

The confidence level module 115 is configured to analyze the input control signals, and in some configurations additional input signals provided by one or more detection units, and determine a probability that the input control signal has a portion attributable to the unintended operator reaction. The probability is referred to as a confidence level. In an example, the confidence level module is configured to perform at least all, or part, of the method in step 804 of FIG. 8.

The candidate adjustment value module 116 is configured to determine a candidate adjustment value to subsequently be used to adjust the input control signal. In an example, the candidate adjustment value module is configured to perform at least all, or part, of the method in step 805 of FIG. 8.

The adjusted input control value module 117 is configured to determine an adjusted input control value using the input control signal and the candidate adjustment value. In an example, the adjusted input control value module is configured to perform at least all, or part, of the method in step 806 of FIG. 8.

Figure 3:
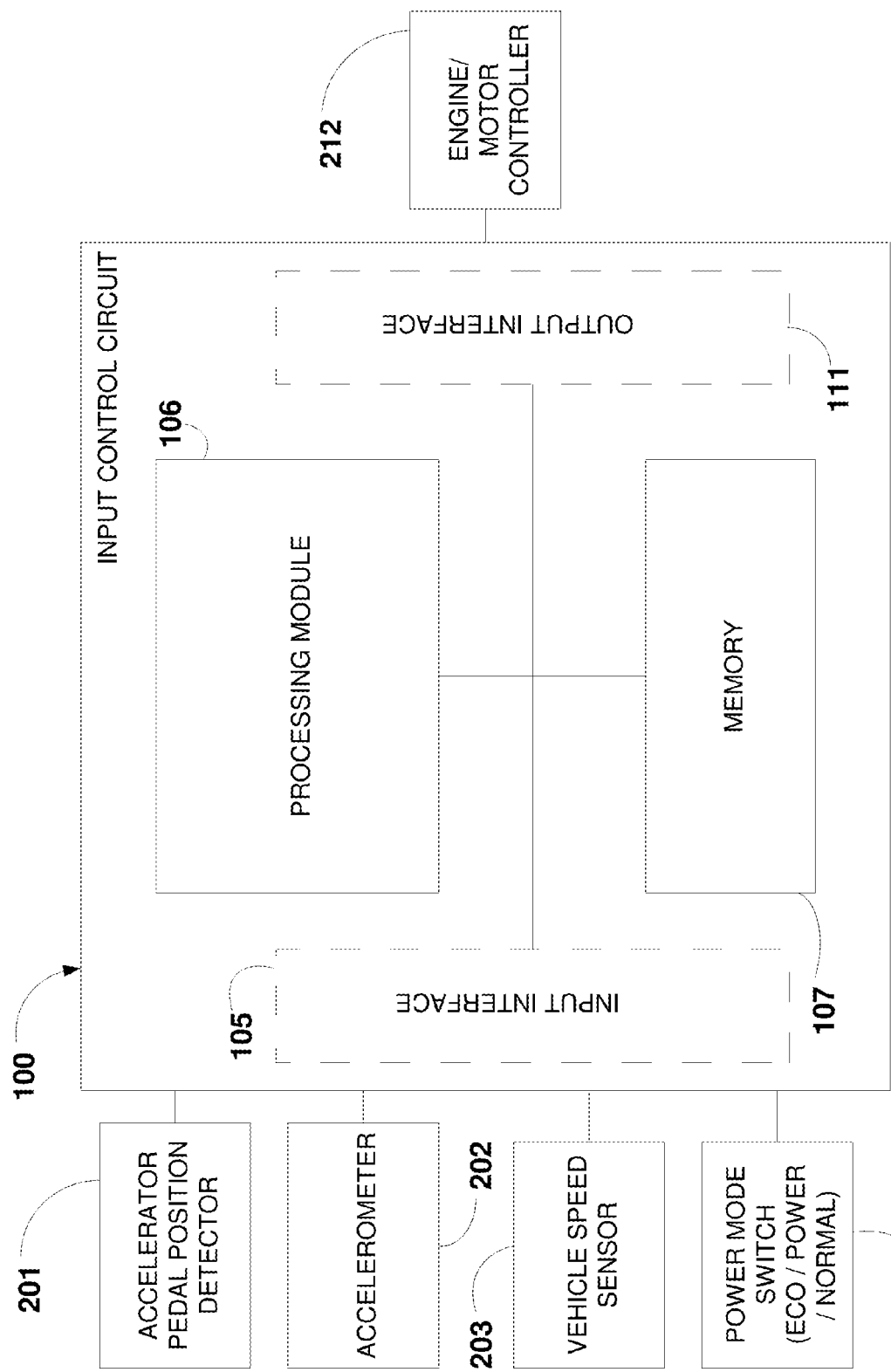
FIG. 3 illustrates a system for providing an adjusted accelerator input position signal according to an embodiment.

The input control system of FIG. 2A is shown and described in terms of general applications. It is understood that the concepts described in relation to FIG. 2A can be used for a wide variety of input control systems. In an exemplary application, the input control system is used in a vehicle having an accelerator pedal as the input control. FIG. 3 illustrates an input control system configured to correct for adjustments to an accelerator input attributable to undesired force, according to an embodiment. In an example, such accelerator input is an accelerator pedal in a land vehicle. In an example, the input control detection unit 101 of FIG. 2A is at least one accelerator pedal position detector 201 in FIG. 3, configured to provide to the input interface 105 an input control signal indicating the force applied to the accelerator pedal by the vehicle operator. Examples of accelerator pedal position sensors include, but are not limited to, sensors that monitor an electromagnetic field, such as Hall-effect sensors, sensors that monitor visual appearance of the accelerator pedal, and other sensors.

In an example, the force detection unit 102 in FIG. 2A includes at least one accelerometer sensor 202 in FIG. 3 configured to provide a force signal to the input interface 105. In an example, such accelerometer 202 provides a signal indicative of forces along three axes. In an example, such accelerometer 202 provides a signal indicative of forces along two axes, such as fore-aft and up-down. In an example, such accelerometer 202 provides a signal indicative of forces along a single axis, such as fore-aft.

In an example, at least one such accelerometer can be located on the chassis near the front wheel on the driver side in order to improve the signal-to-noise ratio, among other things. In an example, at least one accelerometer 202 can be attached on or near the accelerator input, such as directly to an accelerator pedal, in order to detect better one or more undesired force affecting the operator use of such accelerator pedal.

In an example, the auxiliary detection unit 103 in FIG. 2A includes at least one vehicle speed sensor 203 in FIG. 3, configured to provide to the input interface 105 a signal indicating the vehicle's speed.

In an example, the mode detection unit 104 in FIG. 2A includes a power mode sensor 204 in FIG. 3, configured to provide to the input interface 105 a signal indicating the operator-desired driving mode, including, but not limited to, "Power," "Normal," or "Economy" mode. In an example, the operator-desired power mode may influence, among other things, the aggressiveness of the input control circuit 100 in making corrections to the accelerator pedal position signal as described hereinafter.

In an example, the input interface 105 applies signal conditioning to analog signals received from the accelerator pedal sensor, accelerometer, vehicle speed sensor, and power mode sensor. In an example, such input interface converts such signals into corresponding digital values, and synchronizes such signals in a time domain. In an example, such input interface 105 provides a signal that accounts for such synchronized signals.

In an example, the output receiving unit 112 in FIG. 2A includes an engine/motor control module 212 in FIG. 3 that provides control signals to actuators in order to adjust the output force of at least one combustion engine or electric motor, individually or in combination.

Figure 4:
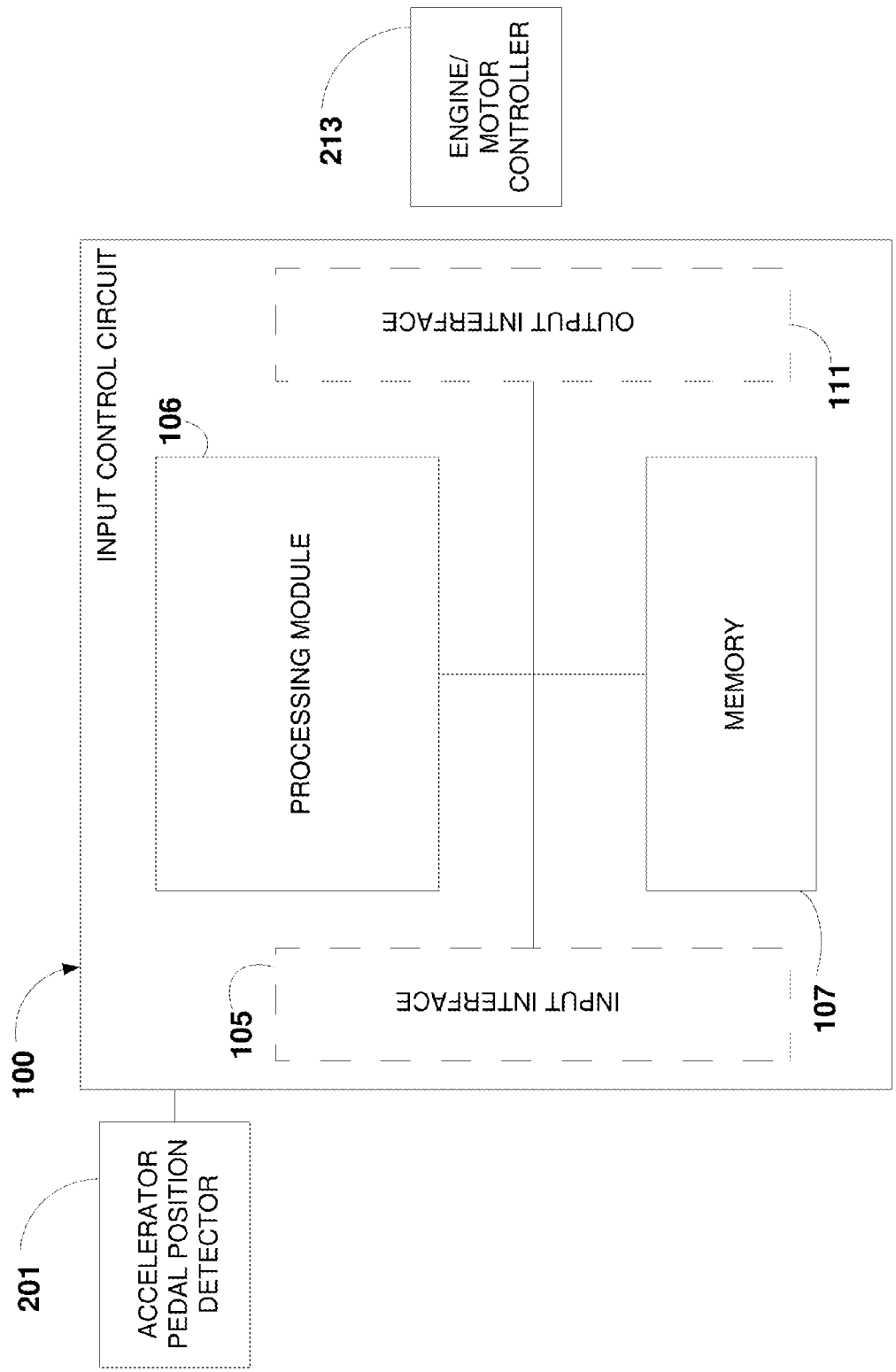
FIG. 4 illustrates a system for providing an adjusted accelerator input position signal without utilizing a force detection unit.

FIG. 4 illustrates an alternate embodiment of the present subject matter to correct for adjustments to an accelerator input attributable to undesired force. In an example, the input control detection unit 101 of FIG. 2A is at least one accelerator pedal position detector 201 in FIG. 4, configured to communicate to the input interface 105 a signal indicating the force applied to the accelerator pedal by the vehicle operator.

In an example, the output receiving unit 112 in FIG. 2A is an engine/motor control module 213 in FIG. 4 that controls the output force of at least one combustion engine or electric motor, individually or in combination.

In an example, the output interface 111 in FIG. 4 is configured to communicate to the engine/motor control module 213 one or both of the original and adjusted signal from the accelerator pedal position detector 201.

In an example, the input control detection unit 101 in FIG. 2A can be located elsewhere in the line of communication between at least one input control and the output receiving unit 112. In an example, the input control detection unit 101 communicates with at least one external electronic control unit (ECU) to obtain at least one input control signal that may have already been processed or modified by such ECU. In an example, the input control circuit 100 can apply computations to derive the original input control signal value before proceeding to apply corrections.

In certain alternate embodiments, the input control detection unit 101 communicates with at least one external ECU to obtain at least one signal not generated by an input control sensor but from which the input control circuit 100 can derive the actual or approximate original signal from such input control sensor(s). In an example, the input control detection unit 101 communicates with at least one external ECU to obtain at least one control signal utilized to adjust the output force of a vehicle powertrain. In an example, the input control circuit 100 can derive the original accelerator pedal position signal through reverse-computation of control signals transmitted to actuators that utilized to adjust the output force of a vehicle engine or motor.

Figure 5:
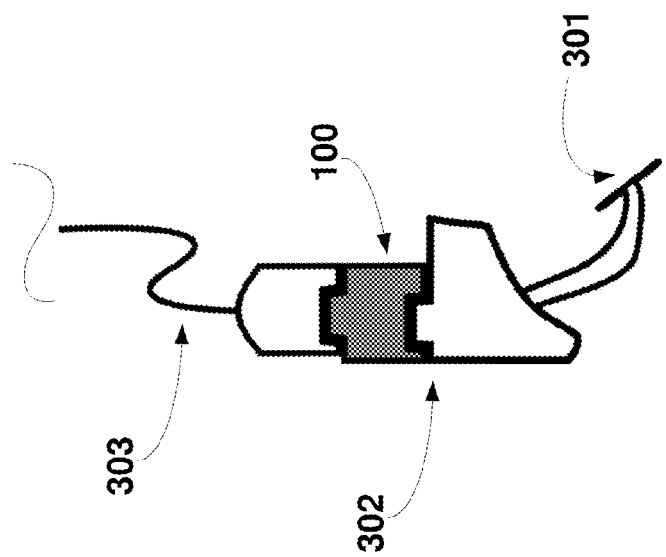
FIG. 5 illustrates an inline implementation of the system coupled with an accelerator pedal assembly and a wire harness according to an embodiment.

In certain other embodiments, instead of interfacing with at least one output receiving unit 112, the output interface 111 may instead interface elsewhere in the line of communication between at least one input control sensor 101 and the output receiving unit 112. In an example, the input control circuit 100 is implemented as an aftermarket inline device between an accelerator pedal position sensor 302 in FIG. 5 and a wiring harness 303 that, among other things, communicates a signal generated by the accelerator pedal position sensor 302 to an ECU, such as the engine/motor control module 212 in FIG. 3. The accelerator pedal position sensor 302 is coupled to an accelerator pedal 301. In another example not pictured, the input control circuit 100 is built directly into an accelerator pedal assembly 300 in FIG. 5. In an example, the input control circuit 100 draws power from the same circuit as the accelerator pedal position sensor 302. In an example, the input control circuit 100 draws power from a circuit other than the circuit from which the accelerator pedal position sensor 302 draws.

In general, the input control circuit can be implemented as part of an existing ECU or as a separate unit. Further, the input control circuit can be physically positioned anywhere in the communication path between the input control, such as an accelerator pedal, and the actuator that uses the input control signal generated by the input control, such as an engine or throttle controller.

The system can operate dynamically, applying a different set of variables in correlation with times, such as varying activation thresholds and rates of correction. The value of a particular variable can be determined through several methods including, but not limited to, computational calculations by the system, time lapse since the last activation, confidence level that an unintended acceleration or deceleration has occurred, reference to at least one table of values, and combinations thereof. Within each method, the specific value of a variable can depend on any number of factors including, but not limited to, pathway conditions, vehicle speed, attitude, and position, as well as operator goals, such as maximizing acceleration or reducing fuel consumption.

Figure 6A:
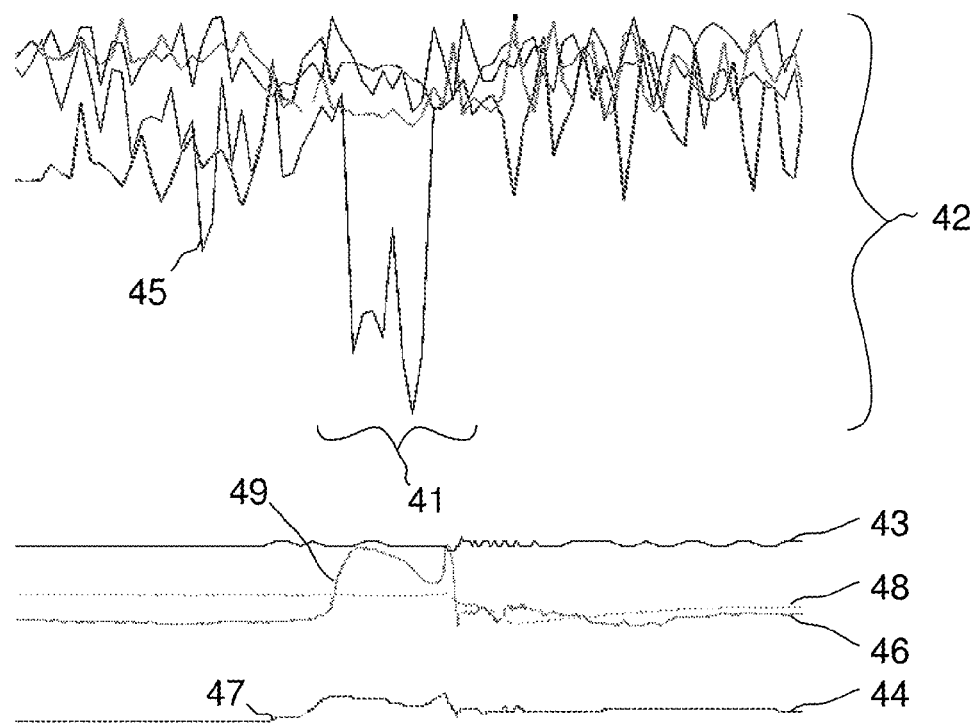
FIG. 6A illustrates an exemplary chart depicting data values representing various sensors in an automobile impinged by a force, such as a force caused by the vehicle driving over a bump on a pathway.

FIG. 6A illustrates an exemplary chart depicting data values representing various sensors in an automobile that is impinged by a force, such as a force caused by the vehicle driving over a bump on a pathway. The exemplary data shown in FIG. 6A corresponds to performance without correction being applied. In an example, the vehicle is traveling at 32 miles per hour yielding 18.2 miles per gallon of operating efficiency. The horizontal axis of the chart represents time, and depicts two seconds of information. The vertical axis shows signal magnitude. In the example, data are aligned along vertical axes. At 42, accelerometer data is provided. At 43, vehicle speed is provided. At 44, accelerator input data is provided. At 46, throttle position data is provided. The throttle position corresponds to an accelerator pedal position when no corrections are made. At 48, revolution per minute ("RPM") data for an engine is provided.

At 45, the accelerometer data indicates that an obstacle has been encountered. Corresponding to the obstacle encounter, accelerator input 44 changes at 47. At 49, approximately 200 milliseconds after 47, the throttle position 46 changes in response to the unintentional adjustment of the accelerator input 44 by the operator. Unintentional adjustment of throttle can be undesirable.

Figure 6B:
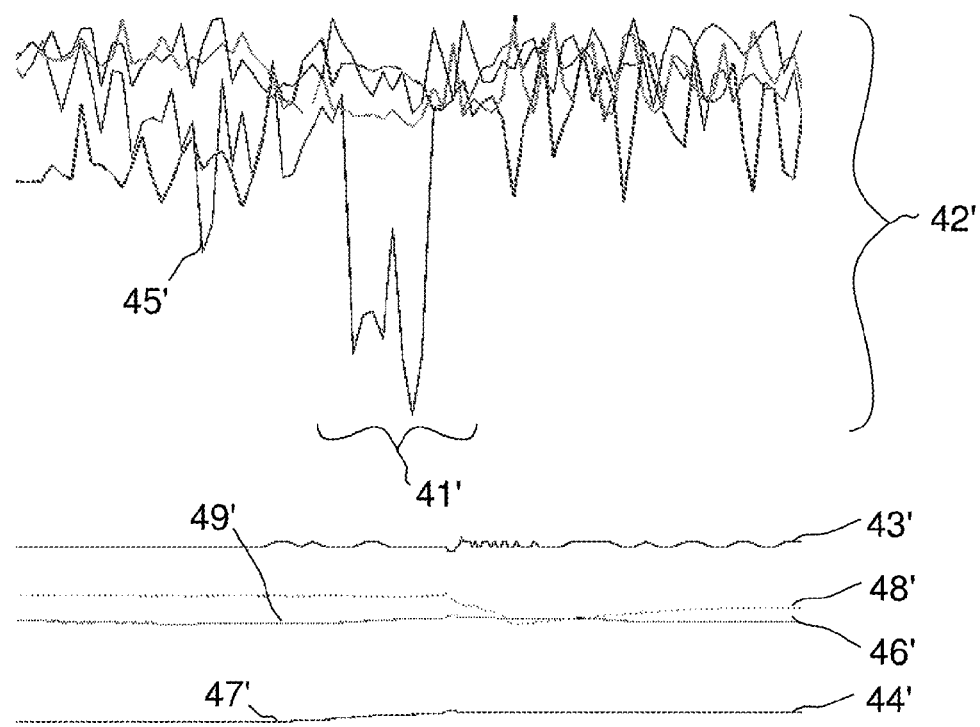
FIG. 6B illustrates an exemplary chart depicting data values correlated with FIG. 6A time-wise, after adjustment for monitored accelerator position signals.

FIG. 6B illustrates a chart depicting data values correlated with FIG. 6A time-wise, after adjustment of monitored accelerator pedal position values. In an example, a 3.85% improvement in fuel efficiency to 18.9 MPG is monitored. At 42, accelerometer data is provided. At 43', vehicle speed is provided. At 44', accelerator input data is provided. At 46', throttle position data is provided. At 48', revolution per minute data for an engine is provided.

At 47', an adjusted input control value, as described hereinafter, is illustrated, showing an accelerator position value that has been adjusted for and indicating little change in contrast to the unadjusted accelerator input data 44 at position 47. At 49', the throttle position 46' is illustrated, resulting at least in part from adjustments to the accelerator input data 44, and showing little change in throttle position during encounter with the obstacle, as well as several additional obstacles 41. Such correction results in a change of approximately 0.7 miles per gallon fuel efficiency.

Figure 7A:
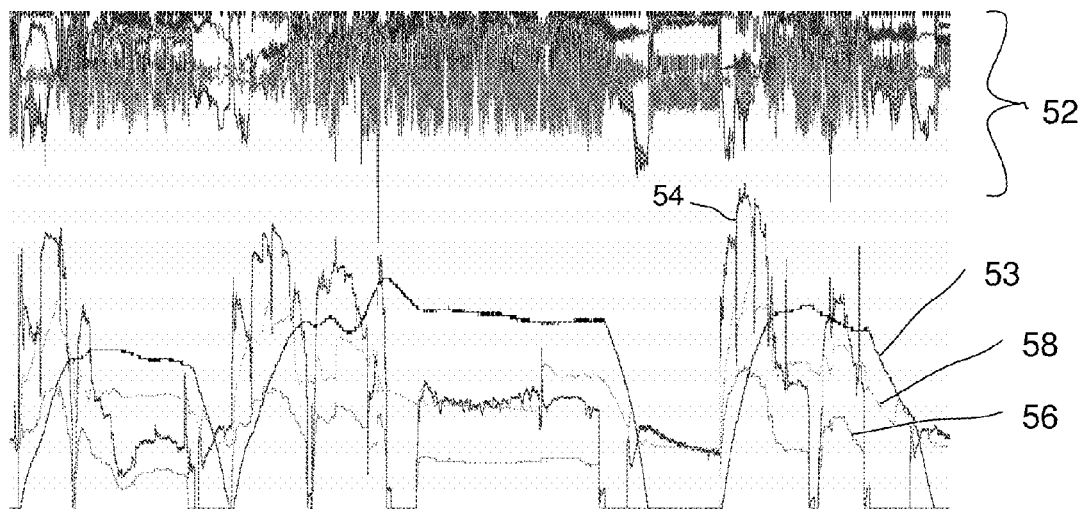
FIG. 7A illustrates an exemplary chart depicting data values collected on a longer field test from various sensors in the automobile.

FIG. 7A illustrates a chart depicting exemplary data values collected on a longer field test from various sensors in an automobile with an average of 17.8 MPG, in an example. The exemplary data shown in FIG. 7A corresponds to performance without adjustment being applied. The horizontal axis of the chart represents time, and depicts 3.6 minutes of information. The vertical axis shows signal magnitude. In the example, data are aligned along vertical axes. At 52, accelerometer data is provided. At 53, vehicle speed is provided. At 54, accelerator input data is provided. At 56, throttle position data is provided. At 58, RPM data for an engine is provided.

Figure 7B:
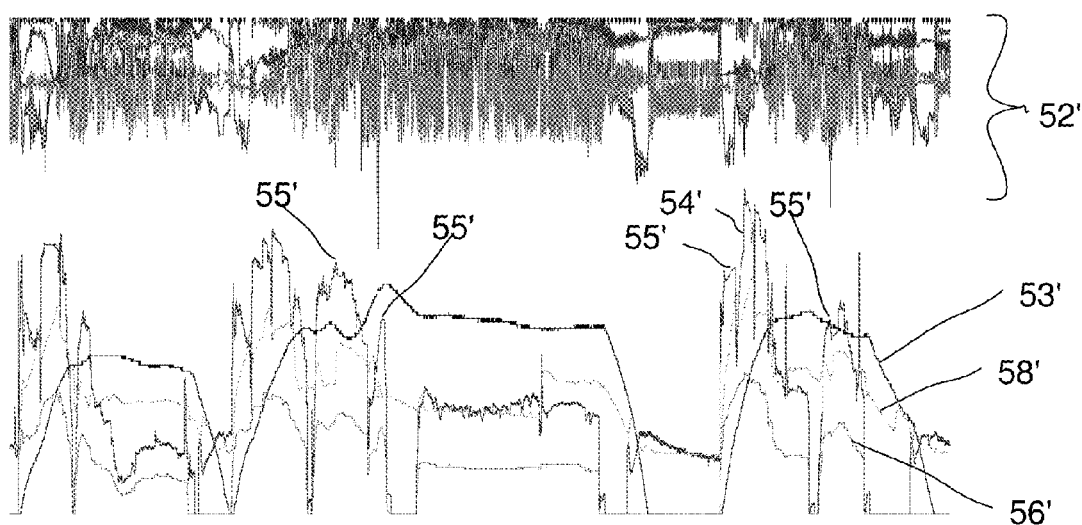
FIG. 7B illustrates an exemplary chart depicting data values correlated with FIG. 7A time-wise, after adjustment for monitored accelerator position signals.

FIG. 7B illustrates a chart depicting data values correlated with FIG. 7A time-wise, after adjustment of monitored accelerator pedal position signals. The chart depicts adjustment resulting in a 2.25% improvement in average fuel efficiency to 18.2 MPG, in an example. At 52, accelerometer data is provided. At 53', vehicle speed is provided. At 54', accelerator input data is provided. At 56', throttle position data is provided. At 58', RPM data for an engine is provided. Several portions 55' show time periods during which more significant adjustments for unintentional actions on the accelerator pedal by the operator. Such adjustments result in a change of approximately 0.4 miles per gallon fuel efficiency over the course of the exemplary data.

Method of Operation

Figure 8:
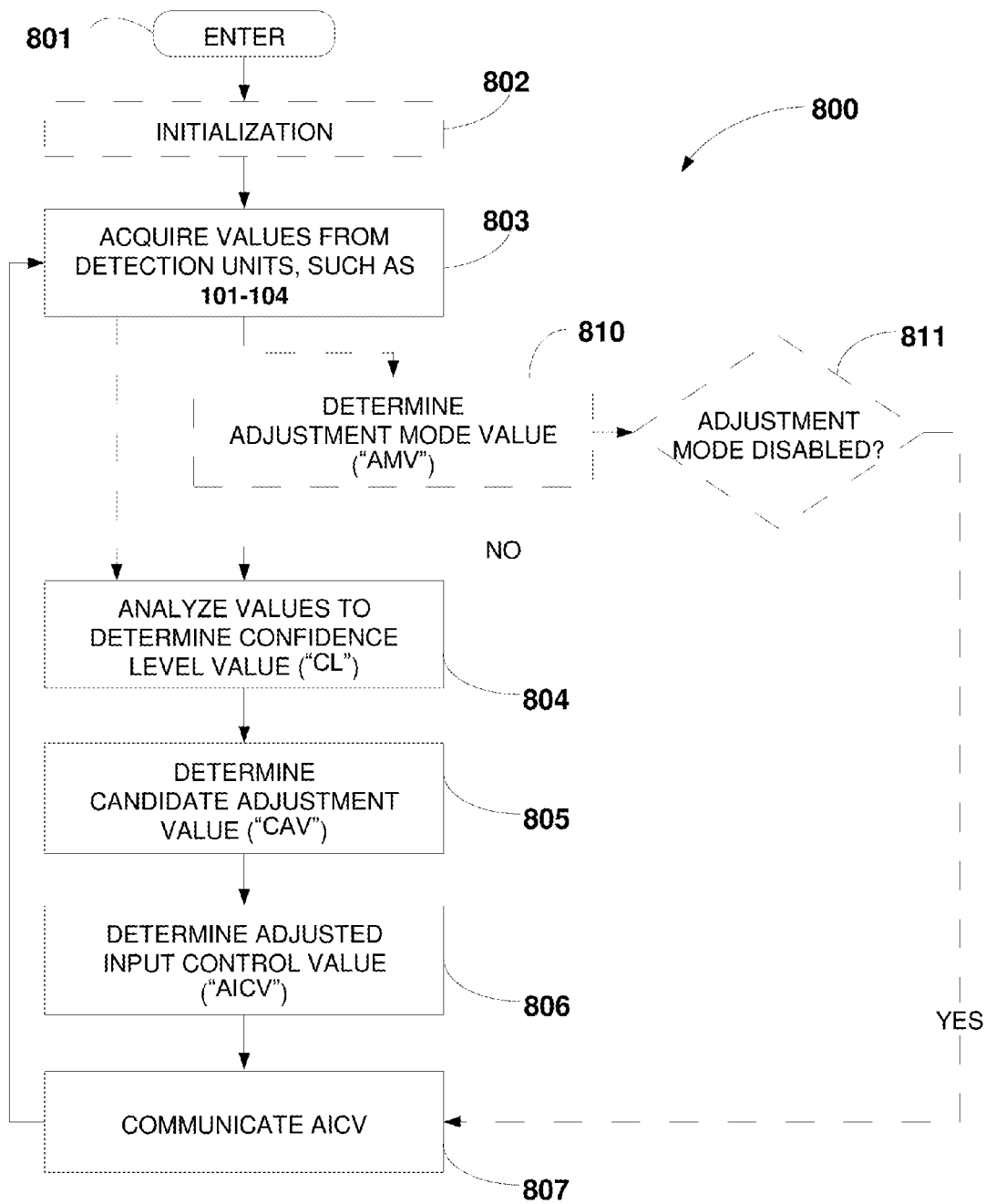
FIG. 8 illustrates a flow diagram depicting a method for providing an adjusted input control according to an embodiment.

FIG. 8 illustrates a flowchart that depicts an example method of providing an adjusted input control value ("AICV") according to an embodiment. The method is entered at step 801. At step 802, the method optionally includes initialization. Exemplary initialization processes can include, but are not limited to: performing a diagnostic to confirm proper operation of system components; loading settings from preset or previously computed and stored values; setting up variables; enabling or disabling certain modes; initializing and setting default expiration values for timers; initializing necessary peripherals for data acquisition, such as opening hardware access to a Control Area Network stream; monitoring and computing baseline vectors and signal noise; and acquiring software descriptors for the data flowing through the stream, which make it possible to read these values in later steps. In some embodiments, information used for initialization is communicated via telematics, such as to a vehicle for use by the vehicle.

At step 803, the method acquires values utilized by the systems and methods disclosed herein. In an example, such values include, but are not limited to, at least one input control value ("ICV"), which indicates the operational state, or adjustments to the operational state, of an input control manipulated by a vehicle operator. The ICV may contain one or both intentional and unintentional components. The ICV may be determined by reference to at least one input control signal. The ICV can also be determined from other values or signals on a vehicle, such as on a vehicle network along a communication path from the input control detection unit 101 to an output receiving unit 112.

In some embodiments, the ICV represents the operator's target adjustment for an input control to control the force output of a vehicle power generator, such as a motor or engine. In an example, the method determines the ICV by reference to at least one accelerator pedal position signal. The accelerator input signal can be obtained from at least one input control detection unit 101, such as the accelerator pedal position detector 201. In another example, the ICV can be determined by at least one other value or signal on the vehicle, such as on a network along a communication path from the accelerator pedal position sensor to the various powertrain components. Such other values or signals include, but not limited to, the values or signals intercommunicated between an engine or motor controller and other controllers, or transmitted by the engine or motor controller to the fuel injector, transmission, and other powertrain components. Although derived in part using the accelerator position signal, these signals can contain influences from other systems and processes.

At step 803, the method can also acquire at least one force value determined by reference to at least one force signal supplied by the force detection unit 102. The method can also acquire one or both of at least one auxiliary value or at least one adjustment mode value determined by reference to at least one auxiliary detection unit 103 or at least one adjustment mode detection unit 104, respectively.

At least one of the values acquired in step 803 can be stored in a buffer including, but not limited to, at least one ICV, at least one force value, at least one auxiliary value, and/or at least one adjustment mode value. In an example, such buffer is a dynamic first-in-first-out ("FIFO") array. In an example, such buffer holds 2.0 seconds of information, but other durations can be used. In an example, a dynamic FIFO array of values adds the newly arriving value to the top of the array and discards the oldest values at the bottom of the array. In an example, a buffer uses a preset sized ring buffer approach.

In some embodiments, if in addition to acquiring an input control value the method also acquires at least one force value, auxiliary value, and/or adjustment mode value at step 803, then the method in step 803 synchronizes such acquired values. In an example, such values are synchronized in a time domain. In another example, such values are synchronized in a value domain. Alternatively, such synchronization may instead be performed later in the method, such as a part of step 804 described below.

Figure 9:
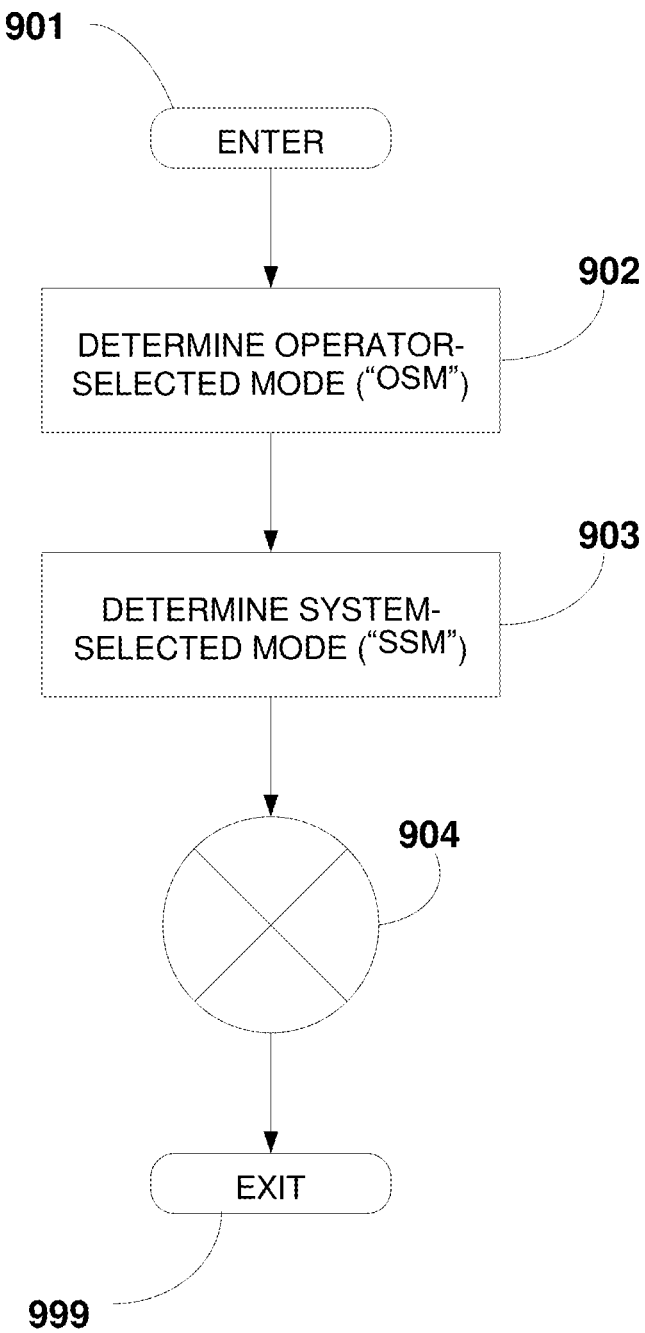
FIG. 9 illustrates a flow diagram depicting a detailed method for determining an adjustment mode value of FIG. 8 according to an embodiment.
Figure 10:
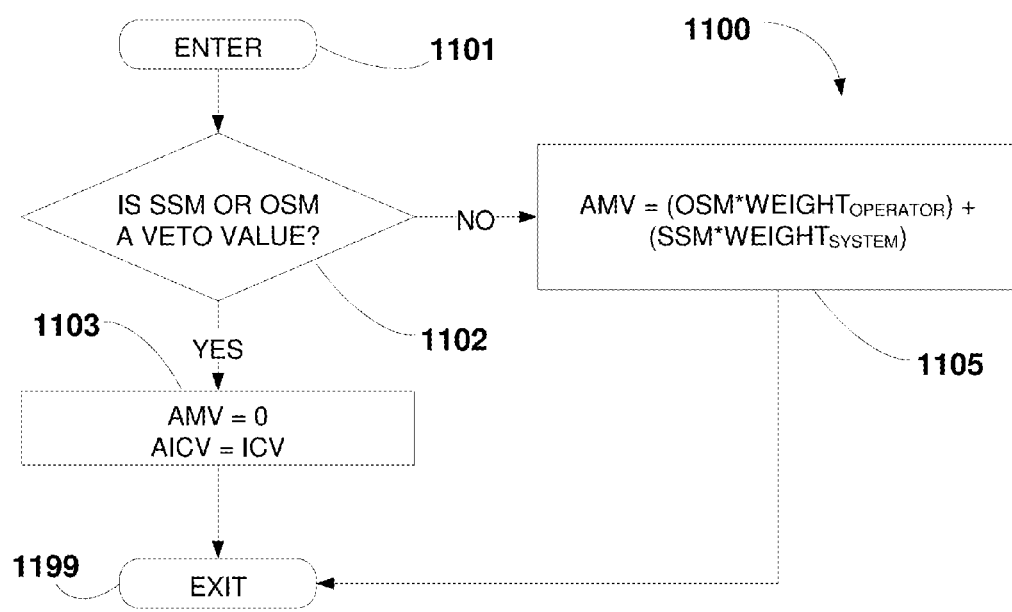
FIG. 10 illustrates a flow diagram depicting a detailed method for utilizing a weighted average to combine at least one operator-selected mode and at least one system-selected mode to determine an adjustment mode value of FIG. 9 according to an embodiment.
Figure 11:
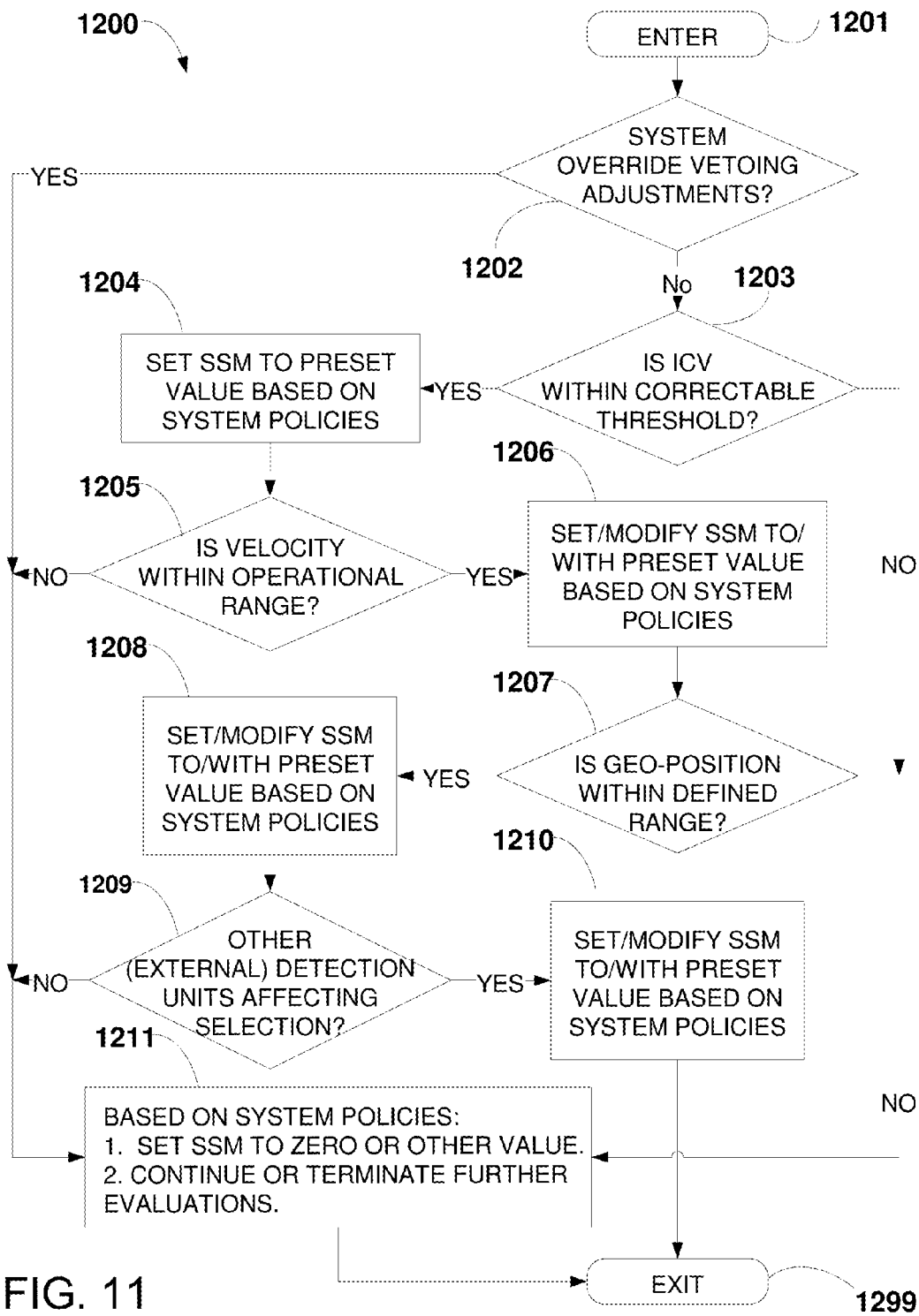
FIG. 11 illustrates a flow diagram depicting a detailed method for determining a system-selected mode of FIG. 9 according to an embodiment.

The method proceeds from step 803 to either step 804 or step 810. The method proceeds from step 803 to step 804 if an adjustment mode value is not utilized. The method proceeds from step 803 to step 810 to determine an adjustment mode value. At step 810, the method optionally determines the adjustment mode value. In some embodiments, the outcome of method 810 is subsequently utilized by systems and methods disclosed herein to determine the aggressiveness with which the systems and methods disclosed herein identify one or more ICV candidates for adjustment and/or to the aggressiveness of adjustments to such candidates. In an example, the adjustment mode value can represent a system's balance between performance and economy for a vehicle when applied to a system for adjusting inputs from an accelerator pedal position detector 201. In some embodiments, the systems and methods described herein apply adjustments to every ICV value and the adjustment mode value is utilized to determine the aggressiveness of the actual adjustment. In some embodiments, an adjustment mode value of zero corresponds to "disabled" while non-zero adjustment mode values correspond to escalating aggressiveness in identifying opportunities to adjust and making actual adjustments in later steps. Other values in other ranges might also be selected depending on implementation. FIGS. 9-11 illustrate exemplary methods for determining the adjustment mode value, as described in detail below.

At step 811, the method determines whether the adjustment mode is disabled, for example the adjustment mode value is set to zero. If it is determined that the adjustment mode is disabled at step 811, then the adjusted input control signal is set to the same value as the input control value and the method proceeds to step 807. If it is determined that the adjustment mode is enabled at step 811, then the method proceeds to step 804.

Figure 12:
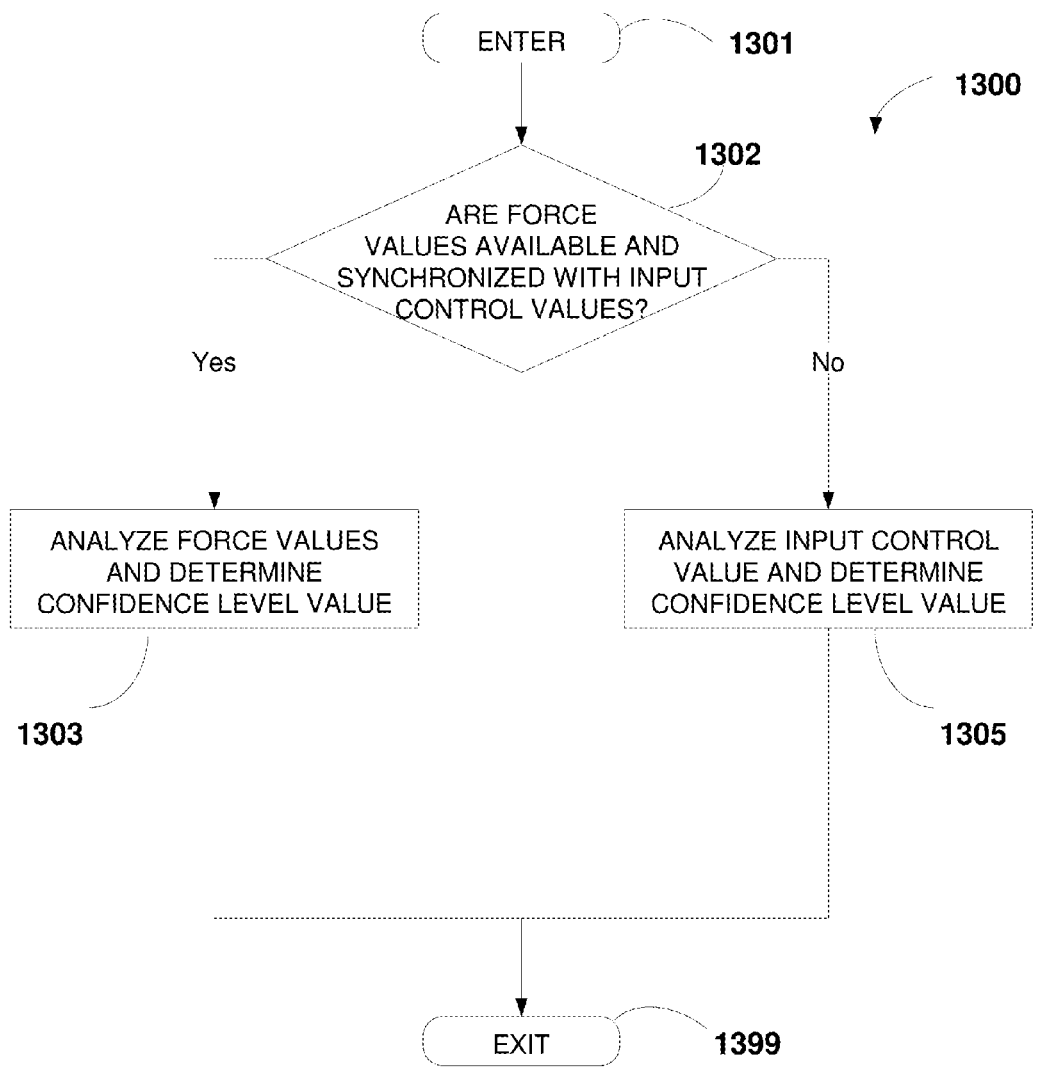
FIG. 12 illustrates a flow diagram depicting a detailed method for analyzing input control values and/or force values of FIG. 8 according to an embodiment.

At the step 804, which is reached either after step 803 or step 811, the method analyzes the synchronized input control values and/or force values acquired by systems and methods disclosed herein. If such values were not previously synchronized, the method may optionally synchronize such values in this step. The values are analyzed to determine a confidence level, which is a variable indicating the probability that at least one undesired force influenced the input control value. In one example, a value of zero corresponds to no confidence while values from 1-100 correspond to escalating degrees of confidence. Other values in other ranges might also be selected depending on implementation. The determined confidence level can be utilized by systems and methods disclosed herein to determine an adjustment to the input control value. FIG. 12 illustrates an exemplary method for analyzing input control values and/or force values, as described in detail below.

Figure 17:
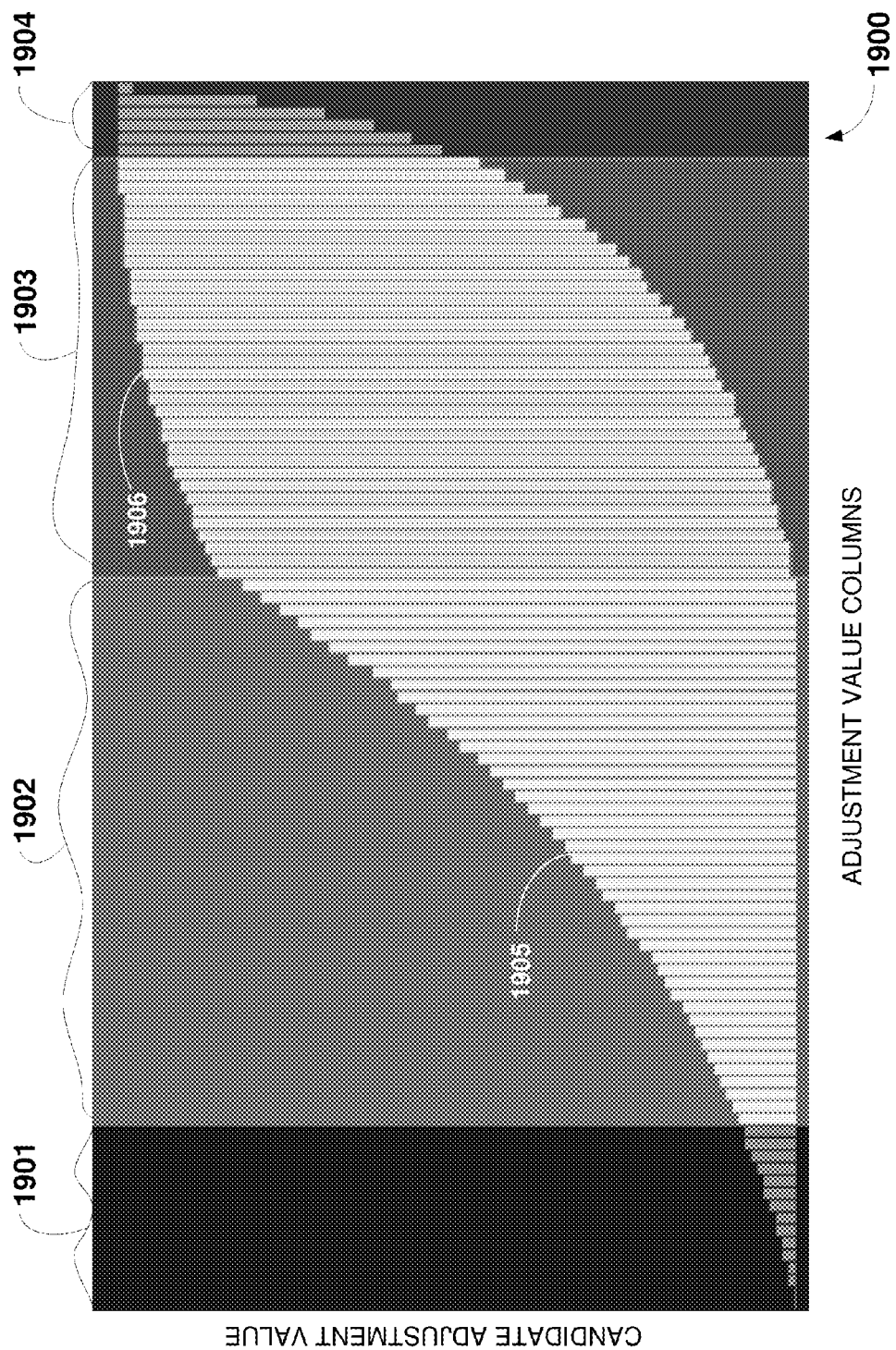
FIG. 17 illustrates an adjustment graph according to an embodiment.
Figure 18:
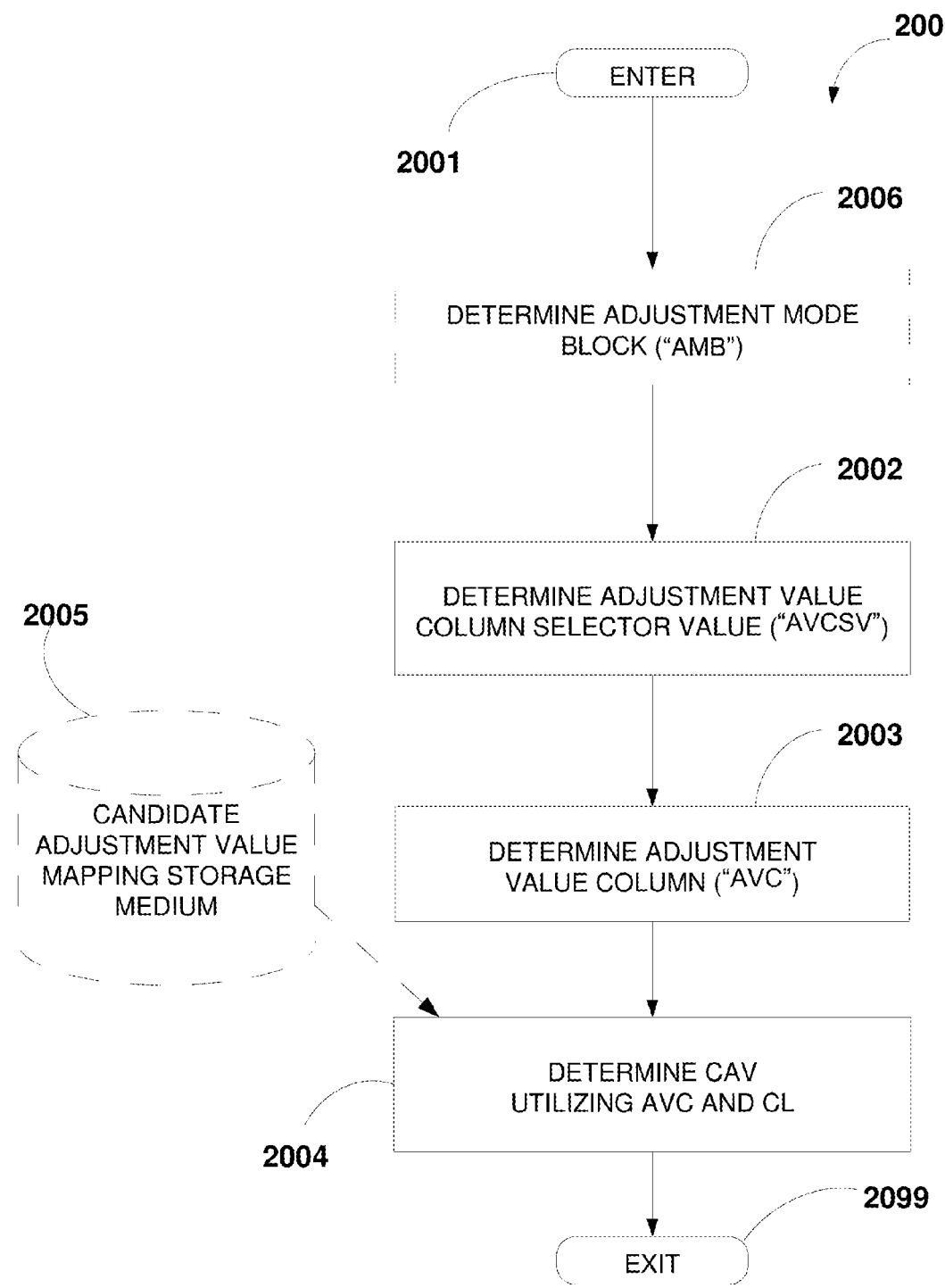
FIG. 18 illustrates a flow diagram depicting a detailed method for determining the candidate adjustment value according to an embodiment.

At step 805, the method determines a candidate adjustment value. The candidate adjustment value can be one or both computed or mapped. The determination can be made by local processing within the system or by processors external to the system. In some embodiments, the candidate adjustment value is a mathematical value including, but not limited to, a coefficient. Systems and methods disclosed herein can use the outcome of this determination and the input control value to determine the adjusted input control value. Systems and methods disclosed herein can apply post-processing to the candidate adjustment value. FIGS. 17 and 18 illustrate two exemplary methods for determining the candidate adjustment value, as described in detail below. FIGS. 19-22 illustrate exemplary methods for applying post-processing to the candidate adjustment value, as described in detail below.

Figure 23:
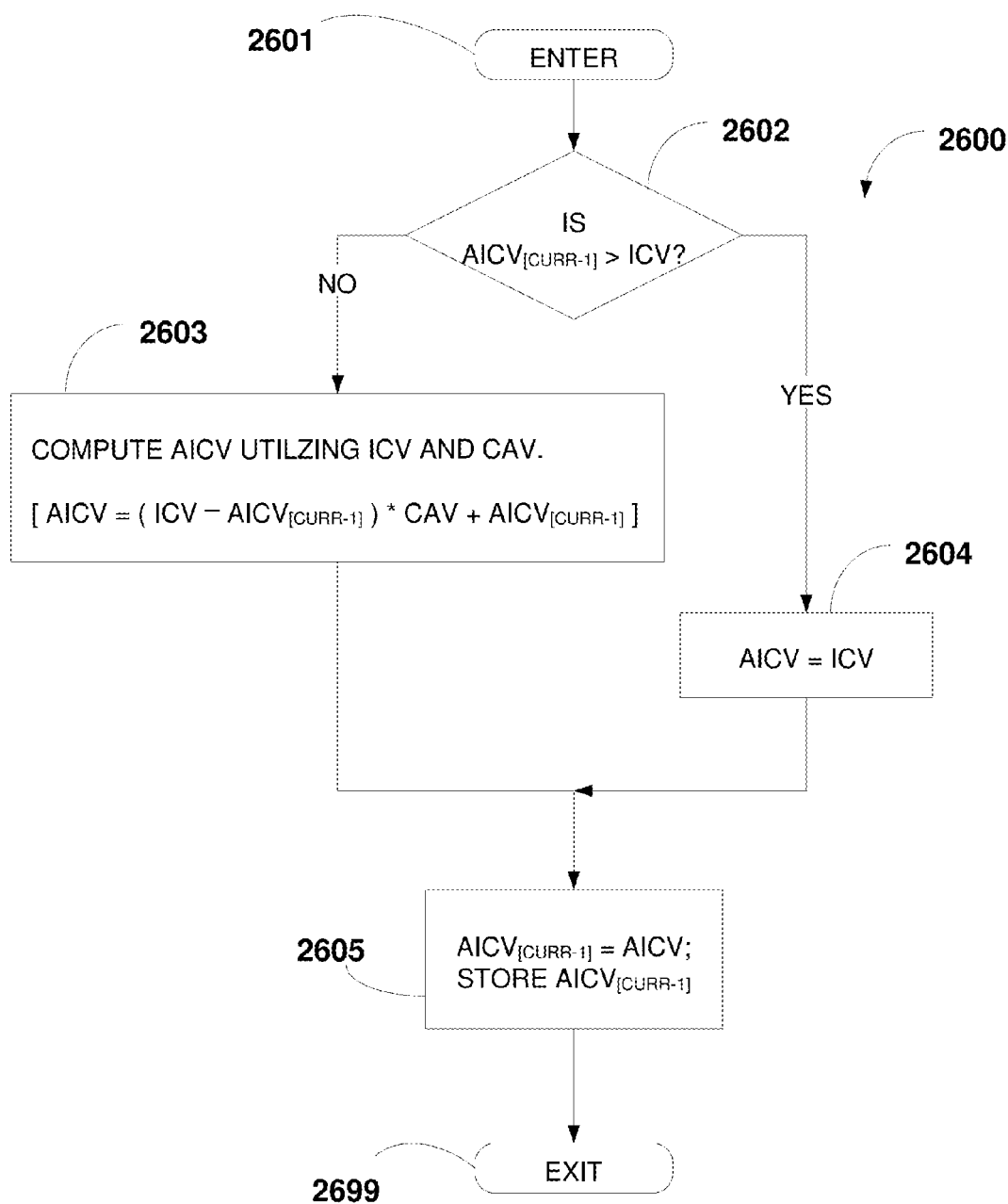
FIG. 23 illustrates a flow diagram depicting a detailed method for utilizing the input control value and candidate adjustment value to determine the adjusted input control value of FIG. 18 according to an embodiment.

At step 806, the method determines the adjusted input control value using the input control value and the candidate adjustment value. In some cases, the adjusted input control value may be substantially similar or even identical to the input control value. The outcome of this determination can be used by systems and methods disclosed herein to communicate the adjusted input control value to the next system or process within the vehicle that uses such value. FIG. 23 illustrates an exemplary method for determining an adjusted input control value, as described in detail below.

At step 807, the method communicates the adjusted input control value to the next system or process that uses this value, such as the output receiving unit 112. The system or method that uses the adjusted input control value may be within the vehicle or extra-vehicular. In an example, the receiver of the communicated adjusted input control value may be one or more actuators that individually or in combination regulate the output force of a vehicle. The method proceeds from step 807 to step 803 to determine an adjusted input control value for a next cycle.

FIG. 9 illustrates a flowchart depicting a method of determining an adjustment mode value according to an embodiment. The method is included in method 810 illustrated in FIG. 8. The method is entered at 901. The method 902 determines an operator-selected mode ("OSM"). OSM is a variable that corresponds to the value from an "operation mode" selector controlled by an operator of a vehicle, such as the mode signal output from the power mode switch 204 in FIG. 3. In an example, such operation mode selector is a power mode switch that allows an operator to select between an "ECONOMICAL" mode, a "NORMAL" mode, and a "POWER" mode, such as by depressing a moment switch or a toggle switch. The selection can affect other variables used by the vehicle for purposes of control, rate of acceleration, and so on. FIG. 3 illustrates an exemplary power mode switch 204 and the mode signal output from the power mode switch 204 is the OSM.

At step 903, the system determines a system-selected mode ("SSM"). SSM is a variable that represents the control or influence of the system and methods described herein as well as other systems upon the adjustment mode value. The range of control or influence can extend from disabling adjustments by the system to decreasing or increasing the aggressiveness with which candidates for adjustment are detected and actual adjustments applied. The method can allow systems, both intra-vehicular and extra-vehicular, to influence or set the adjustment mode value via the SSM. Extra-vehicular SSM can be communicated via telematics, in an example. Intra-vehicular SSM can be propagated by another controller, such as to initiate operation in a "fuel reserve" mode, in an example. FIG. 11 illustrates an exemplary method for determining a SSM.

At step 904, the method combines OSM and SSM into an adjustment mode value. In an example, combination is made using policies and/or conditions. Combination can include methods discussed herein, summation, replacement of one value with another according to a preprogrammed weighted hierarchy, and other functions. For instance, a system-selected mode can be used instead of an operator-selected mode when certain operating parameters are met, such as a vehicle speed within a selected range. In some instances, the combination is for recognizing whether a veto is present, such as a veto described below in relation to FIG. 11. An example of processing a veto is depicted in FIG. 10. An adjustment mode value results from performing the combination at step 904. In an example, an operator such as a manufacturer can instruct other systems to influence, override, or disable adjustments. The method in FIG. 10 offers an example of how such policies can be applied. The method is exited at step 999.

FIG. 11 illustrates a flowchart depicting a method of determining a SSM according to an embodiment. In an example, the method is included in step 903 shown in FIG. 9. The method is entered at step 1201. At 1202, the method determines whether the input control circuit or another system is generating a flag or instruction indicating that systems and methods for adjusting unintended input control signals be overridden. In some embodiments, if such an override instruction exists, correction for unintended accelerator adjustment is vetoed, for example the adjustment mode is disabled by setting the adjustment mode value to zero. A system or method can issue a veto as part of a diagnostic or error-checking function. A veto can be triggered from any of several intra-vehicular or extra-vehicular sources or conditions, such as internal diagnostic fault, vehicle accident, or entry into combat mode.

In an example, a system or method, such as a military system or method, can detect the presence of combat conditions. In an example, an adjustment system can be enabled, but upon detection of a condition such as a combat condition (for example, weapon activation or sudden high-speed maneuver) the system can set the SSM to zero or no adjustment. Setting the SSM to zero can reduce risk of a reduction in vehicle responsiveness. Setting the SSM to zero can increase fuel consumption and can decrease operational range.

If it is determined that there is a system override present at step 1202, then the method proceeds to step 1211. If it is determined that there is not a system override present at step 1202, then the method proceeds to step 1203.

At step 1203, the method determines whether the ICV is within a correctable threshold. In an example, the range for the "correctable threshold" is selected, such as by a manufacturer. In an example, the method does not process changes to a "null" or "zero" reading for the ICV. In an example, a manufacturer can preprogram an accelerator pedal position controller not to make corrections when the operator is using a high level of acceleration, such as during an emergency condition or when entering traffic from an on-ramp. If it is determined that the ICV is not within a correctable threshold at step 1203, then the method proceeds to step 1211. If it is determined that the ICV is within a correctable threshold at step 1203, then the method proceeds to step 1204.

At step 1204, the method sets the SSM to a preset or preprogrammed value based on a predetermined or preprogrammed policy. System policies can be selected by a manufacturer, in an example. The method then proceeds to step 1205.

At step 1205, the method detects whether the velocity of the vehicle is within the operational range for making corrections to the adjustment mode value. In an example, this determination presents an opportunity for manufacturers to implement policies that prevent an accelerator position controller from making corrections in certain circumstances. Circumstances include, but are not limited to, the vehicle traveling at a low rate of speed below a selected minimum, or a high rate of speed above a selected maximum. If it is determined that the velocity is not within the operational range, then the method proceeds to step 1211. If it is determined that the velocity is within the operational range, then the method proceeds to step 1206.

At step 1206, the method modifies the SSM with a value based on a predetermined or preprogrammed policy, such as an instruction preprogrammed into an accelerator position controller. In an example, a manufacturer can implement policies that provide for more correction when the vehicle is not traveling at high speeds above a predetermined or preprogrammed speed, or at low rates of speed below a predetermined or preprogrammed speed. The method then proceeds to step 1207.

At step 1207, the method determines whether the physical position of the vehicle is within an operational geo-positional range or set of ranges. In an example, operational ranges are selected by entities including, but not limited to, manufacturers, a location service provider, an operator or another entity or group of entities. The geo-position of the vehicle may result in different policies, for example if the vehicle is determined to be off-road versus on-road. By way of another example, certain geo-political zones may be designated as high fuel-economy zones. If it is determined that the physical position is within a defined range, then the method proceeds to step 1208. If it is determined that the physical position is not within a defined range, then the method proceeds to step 1211.

In some embodiments, upon determining that the physical position is not within a defined range at step 1208, the method can instead proceed to 1209, foregoing modification of the SSM based on geo-position results, but nevertheless continuing the evaluation process. Such an approach can result in additional modification of the SSM due to the results of other determinations.

At step 1208, the method modifies the SSM with a value based on a predetermined or preprogrammed policy corresponding to the geo-position results in step 1208. The method then proceeds to step 1209.

At step 1209, the method determines whether other sensors and systems, including those outside the vehicle, influence the SSM. For example, a vehicle may communicate directly or indirectly with nearby vehicles regarding environmental conditions on a pathway. In another example, a vehicle may communicate with an extra-vehicular storage medium that provides information about environmental conditions on a pathway. If it is determined that there are other sensors and systems influencing the SSM, then the method proceeds to step 1210. If it is determined that there are not other sensors and systems influencing the SSM, then the method proceeds to step 1211.

At step 1210, the method modifies the SSM with a value based on selected policy corresponding to data provided by other sensors and systems as determined in step 1209. The method is exited at step 1299.

At step 1211, the method disables adjustments in response to data from sensors or instructions produced by the method or associated systems. In an example, to disable adjustments, in 1211 the method sets the SSM to zero or another value based on a predetermined or preprogrammed system policy. Step 1211 is reached by a "YES" determination in step 1202 or a "NO" determination to any of steps 1203, 1205, 1207, or 1209.

It is understood that the exemplary method of FIG. 11 shows exemplary criteria and methodologies for setting and/or modifying an SSM value. It is understood that additional, fewer, or alternative criteria and/or methods can be applied to set and/or modify an SSM value.

In an exemplary application previously described, a map can be generated that associates specific fuel consumption levels and patterns with specific route segments. Such a map can be used to adjust dynamically the aggressiveness of adjustments made by the input control system to correct for pedal dithering, depending upon whether a vehicle, such as a transit bus, is running early or late along a planned route. The SSM can be adjusted to accommodate such an application.

FIG. 10 illustrates a flowchart of a method of utilizing an OSM and SSM to determine an adjustment mode value according to an embodiment. The method is entered at step 1101. At step 1102, the method queries whether OSM or SSM include a veto value. If a veto is present, then at step 1103 the adjustment mode value is set to zero, which indicates no correction is to be made to the input control value, and the adjusted input control value is set to the input control value.

If it is determined at step 1102 that the OSM and/or SSM do not include a veto value, then at step 1105 the adjustment mode value is set to a weighted ("WT") average of OSM and SSM. The value of WT for the OSM or SSM can be either preselected or dynamically adjusted based on manufacturer and/or operator policies and/or preferences. Other methods of computing AMV can also be implemented. The method exits at step 1199.

FIG. 12 illustrates a flowchart of a method of analyzing force values and/or input control values. The outcome of this method is a confidence level value. The outcome of the method can be utilized by systems and methods disclosed herein to determine the candidate adjustment value, as hereafter described. In an example, the method functions within step 804 of FIG. 8.

The method of FIG. 12 is entered at step 1301. At step 1302, the method determines if detected values other than input control values, for example force values, were previously acquired, such as at step 803 in FIG. 8, and whether such values are synchronized with the input control values. The outcome of this query determines whether systems and methods described herein utilizes input control values exclusively or values other than input control values for purposes of determining the "confidence level value" as described herein at steps 1304 and 1306.

In an example, input control values are associated with an accelerator input signal, such as generated by an accelerator pedal position detector 201 in FIG. 4. In an example, force values are associated with an accelerometer sensor 202 in FIG. 3 that generates a signal indicating the presence of inertial forces, such as inertial forces experienced by one or both the operator and the accelerator pedal as a result of a vehicle encountering a pathway obstacle. In an example, such force values and/or input control values are available in real-time, near real-time or in batch mode from one or more sources, such as at least one sensor, storage medium, and/or other system or method available over a network. If it is determined at step 1302 that the input control values and the force values have been synchronized, then the method proceeds to step 1303. If it is determined at step 1302 that the input control values and the force values have not been synchronized, then the method proceeds to step 1305.

Figure 13:
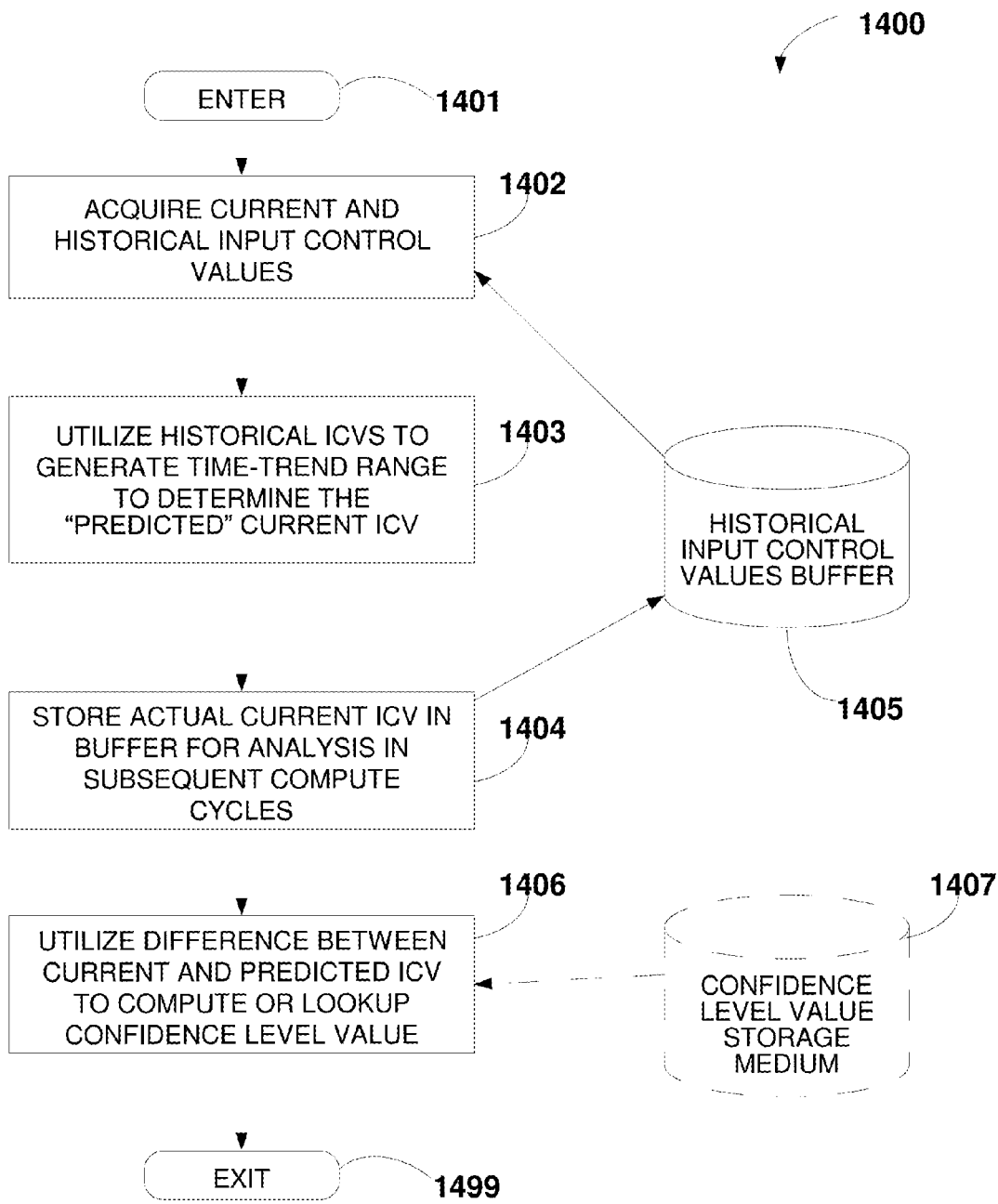
FIG. 13 illustrates a flowchart of a method to analyze the current and historical input control values to determine the confidence level value of FIG. 12 according to an embodiment.
Figure 14:
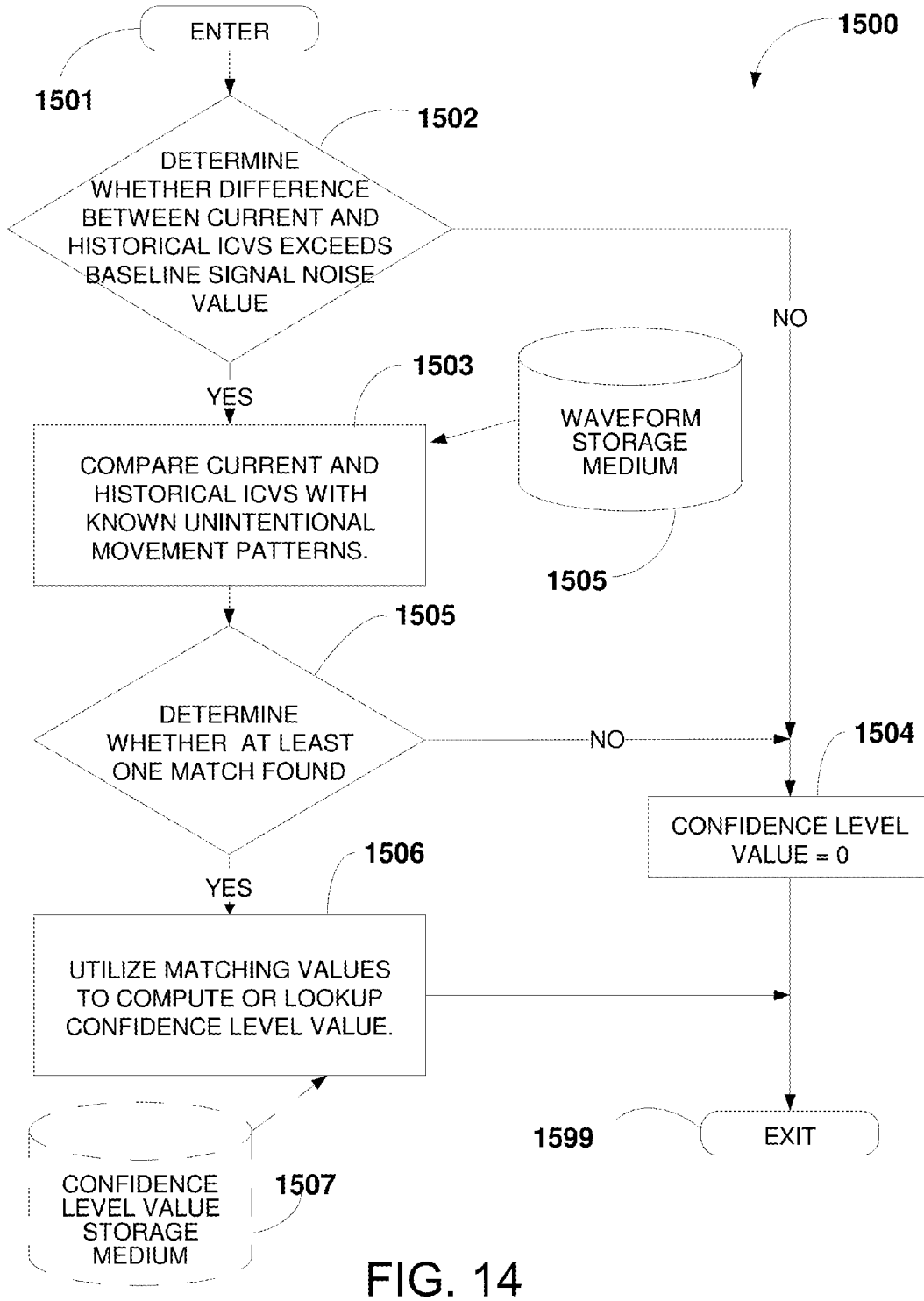
FIG. 14 illustrates a flowchart of another method to analyze the current and historical input control values to determine the confidence level value of FIG. 12 according to an embodiment.

In some embodiments, the method can analyze the current and historical input control values, such as from an input control detection unit 101 in FIG. 2A and a buffer, at step 1305. The outcome of step 1305 can be a confidence level value that can be utilized by systems and methods disclosed herein to determine the candidate adjustment value. In an example, FIG. 13 provides a method for analyzing current and historical input control values utilizing time-trend analysis to determine the confidence level value. In another example, FIG. 14 provides a method for analyzing current and historical input control values utilizing waveform matching to determine the confidence level value. Other methods are possible. The method then proceeds to step 1399.

Figure 15:
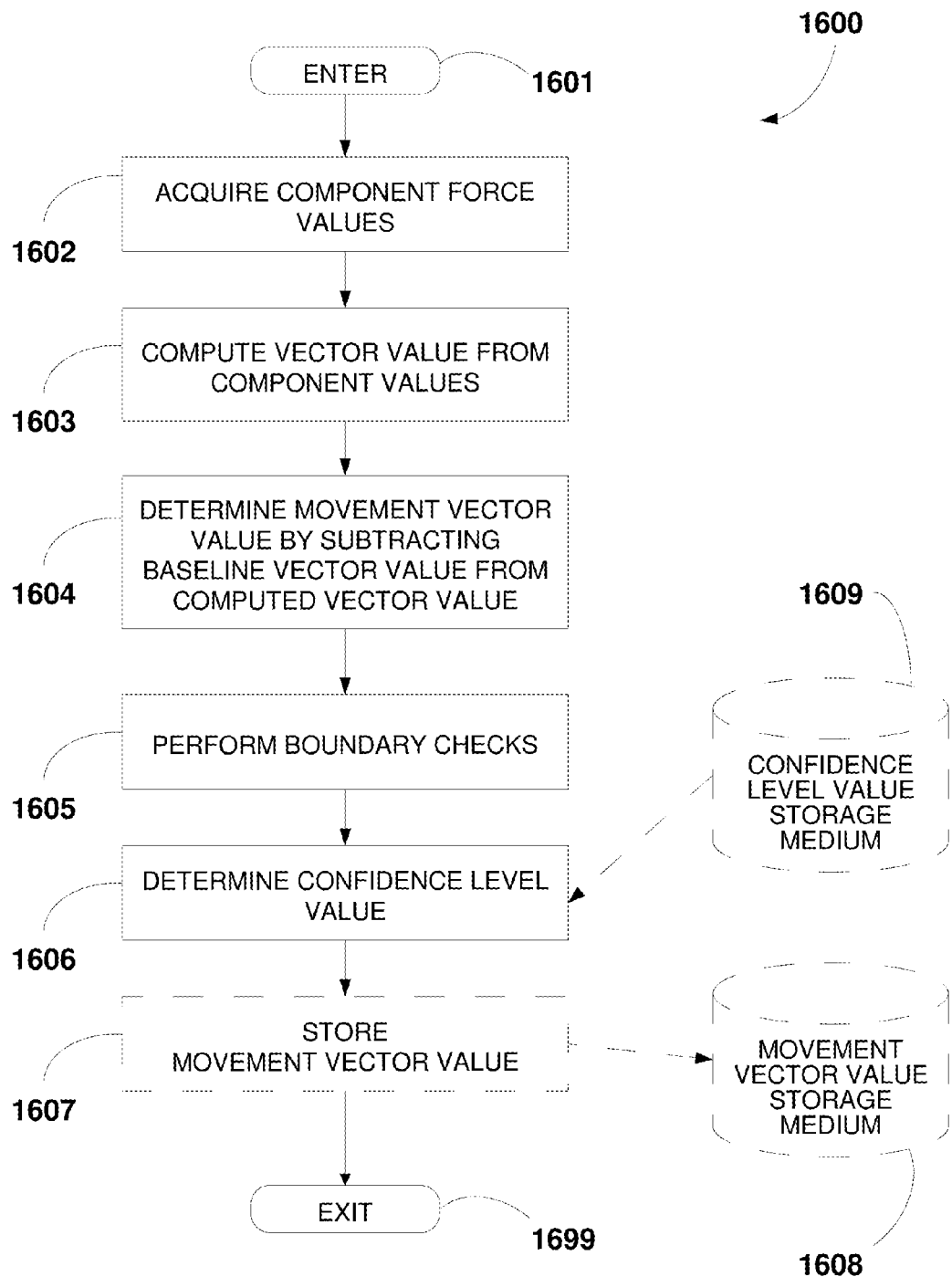
FIG. 15 illustrates a flow diagram depicting a detailed method for analyzing force values to determine the confidence level value of FIG. 12 according to an embodiment.

If it is determined at step 1302 that both input control values and force values are available and such values are synchronized, then the method proceeds to step 1303. At step 1303, the method can analyze the force values, such as from a force detection unit 102 in FIG. 2A and a buffer. The outcome of step 1303 can be a confidence level value that can be utilized by systems and methods disclosed herein to determine the candidate adjustment value. In an example, FIG. 15 provides a method for analyzing force values in order to determine a confidence level value. The method exits at step 1399. In an example, the method proceeds to step 805 in FIG. 8. Step 1303 and the exemplary method of FIG. 15 use the force values to determine the confidence level value. Alternatively, a combination of different detected values can be used to determine the confidence level value, such as the force values and the input control values. For example, a change in the input control value from one cycle to the next cycle can be determined and compared to a threshold value. If the change exceeds the threshold value, then the aforementioned force value analysis can be performed. If not, then the confidence level value is set to zero.

FIG. 13 illustrates a flowchart of a method to analyze input control values according to an embodiment. In an example, the method functions within step 1305 of FIG. 12. At step 1401, the method of FIG. 13 is entered. At step 1402, the method acquires the input control value, such as from an input control detection unit 101 in FIG. 2A, and historical input control values, such as from a buffer 1405 in FIG. 13. In some embodiments, historical input control values are those input control values corresponding to recent operation of the vehicle, such as over the previous 5.0 seconds.

At step 1403, the method determines a "predicted" input control value for the current cycle by generating a time-trend range associated with the historical input control values. In some embodiments, a curve-fitting method is applied to stored historical input control values, such as accelerator pedal position values, to generate the predicted input control value. Other predictive methods are possible.

At step 1404, the method stores the current input control value in the buffer 1405, such as for historical analysis by subsequent methods. In some embodiments, storing the current and predicted input control values provides feedback used by a learning algorithm. At step 1406, the method determines the difference between the current and predicted input control values and utilizes the difference to determine the confidence level value. In some embodiments, the confidence level value is computed utilizing such difference. In other embodiments, the confidence level value is mapped, such as from a storage medium 1407, utilizing such difference. Such a mapping approach may incorporate a learning system. At step 1499, the method exits. In an example, the method proceeds to step 1399 in FIG. 12.

FIG. 14 illustrates a flowchart of another method to analyze the current and historical input control values to determine the confidence level value according to an embodiment. In an example, the method functions within step 1305 of FIG. 12. The method enters at step 1501. At step 1502, the method determines whether a difference between current and historical input control values exceeds a baseline signal noise value. In some embodiments, the baseline signal noise value is monitored and computed, such as during initialization at step 802 in FIG. 8. In other embodiments, the baseline signal noise value is determined or updated after initialization during an observed short period of stationary state of the vehicle, which can be derived from a speed sensor or from a vehicle state change, such as putting a land vehicle in "park." In some embodiments, the outcome of this method is used by systems and methods disclosed herein to adjust the confidence level value or perform further queries and comparisons to identify the influence, if any, of one or more undesired force in the input control value. In an example, the method utilizes three variables that correspond to the current input control value and the most recent two historical input control values, referred to as $ICV_{CURR}$, $ICV_{[CURR-1]}$, and $ICV_{[CURR-2]}$. $ICV_{[CURR-1]}$ corresponds to the ICV in the immediately preceding cycle. $ICV_{[CURR-2]}$ corresponds to the ICV in the cycle immediately preceding $ICV_{[CURR-1]}$. It is understood that more than the two most historical ICVs can be used. In an example, the method computes the absolute value of ICV minus $ICV_{[CURR-1]}$ and the absolute value of $ICV_{[CURR-2]}$ minus $ICV_{[CURR-1]}$, such as with a comparator. The method then queries whether the absolute value of at least one of those sums is greater than the baseline signal noise value. A value greater than the baseline signal noise value is considered to be an event other than noise. If it is determined that the absolute value of the difference at step 1502 is greater than the baseline signal noise value, then the method proceeds to step 1503. If it is determined that the absolute value of the difference at step 1502 is not greater than the baseline signal noise value, then the method proceeds to step 1504. At step 1504, the method sets the value of confidence level value to zero: CL=0. The method then exits at step 1599.

At step 1503, the method compares the waveform generated by current and recent historical input control values with at least one known waveform for unintentional movement. Such known waveforms for unintentional movement patterns can be stored in a storage medium 1505, such as in a vehicle or on a network. The known waveforms may be one or both static or "learned" by the input control circuit 100 through analysis over time. In an example, the algorithm for making such comparison may be influenced by environmental and other factors, including but not limited to, the geo-position of the vehicle.

In some embodiments, the method compares the current and historical input control values for a period of time. In some embodiments, the comparator utilizes the vehicle's geo-position to lookup from the storage medium 1505 at least one known waveform associated with the geo-position. In an example, the waveform and accompanying data indicate that the vehicle is traversing rolling hills on a highway and, as such, initiates a comparative search between "long" known waveforms and the current and historical input control values. In an example, "long" waveforms extend from 1.0 through 8.0 seconds, although other lengths are possible. In another example, the geo-position instead indicates that the vehicle is traversing off-road conditions. In this example, at step 1503 the method compares at least one "short" known waveform to the current and historical input control values. In an example, "short" waveforms extend from 50 ms to 250 ms, although other lengths are possible. In this manner, the known waveforms can be categorized. In another example, different known waveforms are used for comparison if the vehicle speed is 20 mph versus 50 mph. Continuing this example, different vehicle speed or range of speeds have different known waveforms to which the current and historical input control values are compared.

At step 1505, the method determines whether at least one match was found during the comparison at step 1503. In an embodiment, the adjustment mode value may influence the range of values for which one or more known waveforms for unintentional movement may be considered a "matching" waveform for the current and historical input control values. If it is determined that no match is found, the method proceeds to step 1504. If one or more matches are found at step 1505, the method proceeds to step 1506.

At 1506, the method determines the confidence level value using the matched waveforms from step 1505. In some embodiments, the confidence level value may be mapped, such as from a storage medium 1507. Such a mapping approach may incorporate a learning system. In other embodiments, the confidence level value may be computed. In an example, the confidence level value may be increased when the systems and methods described herein positively correlate known unintentional movement patterns with current and historical input control values. Assigning a confidence level value based on the degree of correlation can be done in a linear or non-linear manner. For example, using a linear method, as the correlation decreases, the confidence level value may be set to decrease at a linear rate relative to the decrease in correlation. In another example, using a non-linear method, as the correlation decreases, the confidence level value may be set to decrease at a non-linear rate relative to the decrease in correlation. In some embodiments, the confidence level value can be assigned based on a symmetric or asymmetric manner, such as further increasing or decreasing the confidence level value depending on direction of change of the current input control value. For example, the confidence level value may be set to a less aggressive value, or even set to zero, when the current and historical input control values, such as from an accelerator pedal position detector 201 in FIG. 3, indicate that the operator is decelerating the vehicle, regardless of whether such deceleration is intentional or unintentional. Conversely, the confidence level value may be set to a more aggressive value when such input control values indicate that the operator is accelerating the vehicle.

In another example, if the current input control value is changing in the same direction, positive or negative, compared to the most recent historical input control value $ICV_{[CURR-1]}$, as the most recent historical input control value $ICV_{[CURR-1]}$ is changing compared to the preceding historical input control value $ICV_{[CURR-2]}$, then the confidence value is given a higher value. Conversely, if the current input control value $ICV_{CURR}$ is changing in the opposite direction compared to the most recent historical input control value $ICV_{[CURR-1]}$ as the most recent historical input control value $ICV_{[CURR-1]}$ is changing compared to the preceding historical input control value $ICV_{[CURR-2]}$, then the confidence value is given a lower value. Changes in direction are given a higher probability of unintentional force in this example. In other embodiments, such symmetric or asymmetric The method proceeds to step 1599. At step 1599, the method exits. In an example, the method proceeds to step 1399 depicted in FIG. 12.

FIG. 15 illustrates a flowchart of a method for analyzing force values to determine a confidence level value according to an embodiment. In an example, the method functions within step 1303 of FIG. 12. The outcome of FIG. 15 is a confidence level value. The method enters at step 1601. At step 1602, the method acquires the force signals, such as from the force detection unit 102 and/or a buffer. In an example, the force detection unit 102 is an accelerometer sensor 202 providing a signal indicating motion along an x-axis, motion along a y-axis, and/or motion along a z-axis.

At step 1603, the method computes a vector value from the force value components acquired at step 1602. In an example, the acquired force value components are converted into spherical coordinates, although other coordinate systems are possible. In an example, the method computes the vector value utilizing a length/direction computation.

At step 1604, the method compares the vector value computed at step 1603 to a baseline vector value. The difference between the vector value and a baseline vector value is a movement vector for the vehicle. In some embodiments, the baseline vector value is determined during non-movement of the vehicle, where a controller, such as the force analyzer 106, detects a slight variation of the force signal of a force detection unit 102, such as an accelerometer sensor 202 in FIG. 3. Such variation may be due to sensor signal noise. In some embodiments, signal noise is monitored and computed. In other embodiments, only vector magnitude is recorded when monitoring and recording noise. In some embodiments, a noise threshold is used to monitor noise. In some embodiments, the baseline vector value is determined as part of the initialization 802 in FIG. 8. In other embodiments, the baseline vector value is determined or updated after initialization, during non-movement of the vehicle.

At step 1605, the method performs boundary checks on the movement vector. An exemplary method of performing such boundary checks is detailed in FIG. 16.

At step 1606, the method determines the confidence level value utilizing the movement vector. In some embodiments, the method utilizes a length of the movement vector ("LMV") to determine the confidence level value. In some embodiments, the method determines the confidence level value by comparing the LMV to the baseline vector value. In an example, if the LMV is within 1.1 to 2.0 times the baseline vector value, the confidence level value may be computed and/or mapped to a linear value, such as by looking up confidence level values from a storage medium 1608. In an example of linear mapping, if the LMV to noise level ratio is from 1.1 to 2.0, then the confidence level value can be mapped from 0.1 to 0.3, or 10 percent to 30 percent, respectively. In another example, instead of linear mapping, such mapping may be non-linear, such as logarithmic. In another example, mapping can by symmetric or asymmetric. An example of asymmetry is providing different confidence level values if the vehicle is accelerating versus if the vehicle is decelerating.

In some embodiments, the mapping information is stored as a look-up table in a storage medium 1609. The mapping storage medium can be located on-vehicle or remotely. In an example, one vehicle can store mapping information used by another vehicle, where the mapping information is communicated to a remote location directly, over the Internet or another network. In an example, such a mapping approach may incorporate a learning system.

In some embodiments, confidence level value is computed. In an example, such computation occurs without spherical coordinate computations. In an example, accelerometer sensor orientation is known and used to compute a confidence level value using values in a coordinate system other than a spherical coordinate system. In an example, a single, dedicated axis is used. In an example, the single, dedicated axis is associated with unintended movements. For example, in a land vehicle, unintended movement occurs roughly up and down with a slight tilt towards the driver.

In some embodiments, the confidence level value optionally may be increased or decreased depending upon the adjustment mode value.

At step 1607, the method optionally stores the movement vector, such as in a movement vector value storage medium 1608 for calibration-related statistical analysis, such as for a learning system.

The method exits at step 1699. In an example, the method proceeds to step 1399 in FIG. 12.

Figure 16:
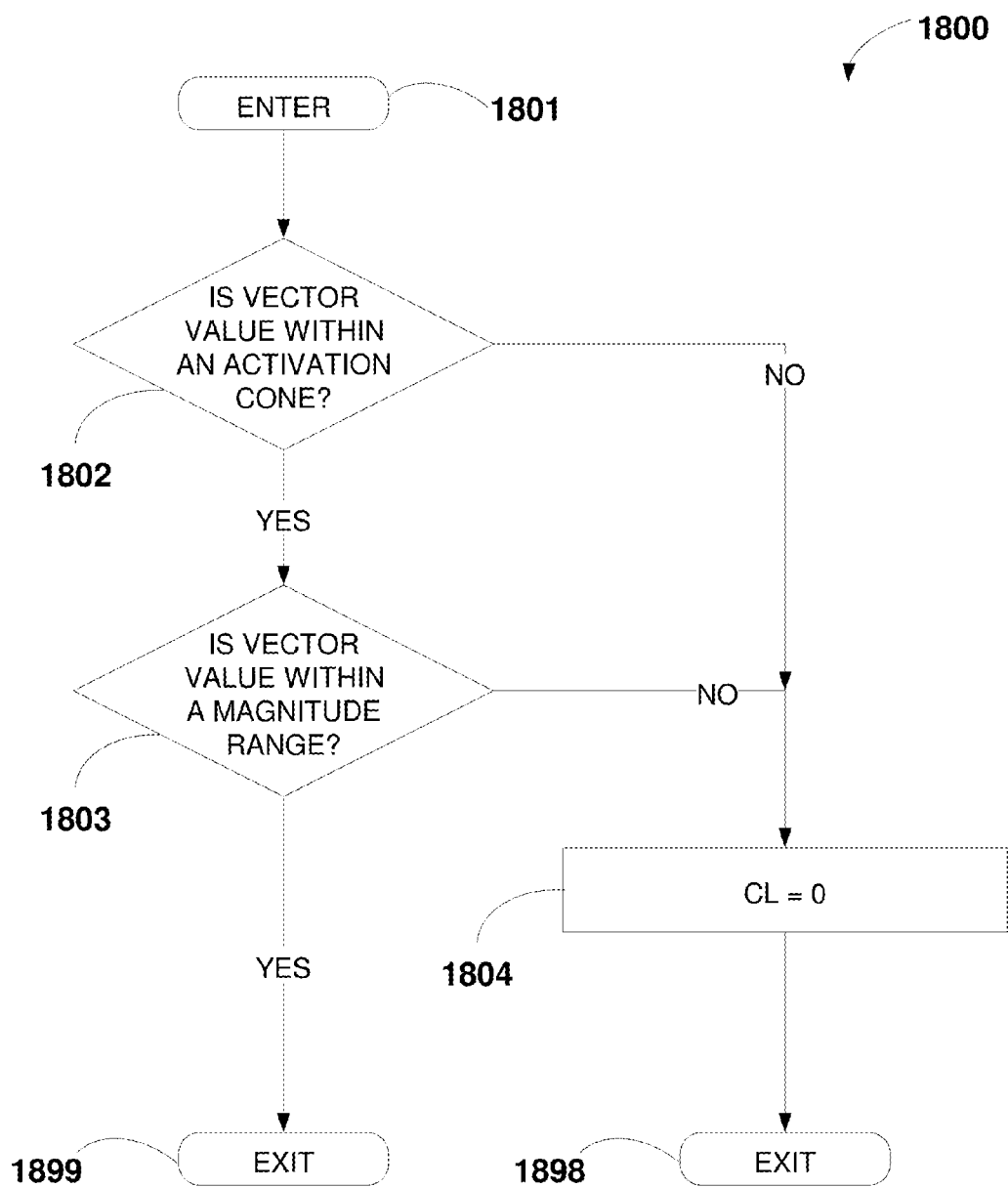
FIG. 16 illustrates a flow diagram depicting a detailed method for determining whether a movement vector is inside or outside a boundary according to an embodiment.

FIG. 16 illustrates a flowchart of a method of performing a boundary check on a movement vector according to an embodiment. In an example, the method is included within step 1605 of FIG. 15. One outcome of this method can be that the systems and methods described herein set the confidence level to zero within a particular cycle and proceed to step 1699 in FIG. 15 or, optionally, to step 1607 in order to store the movement vector value before exiting at step 1699. Another outcome of this method can be that the systems and methods described herein proceed to step 1606 in order to determine the confidence level value.

The method is entered at step 1801 of FIG. 16. At step 1802, the method determines whether the movement vector is within an activation cone. In an example, if the movement vector is within a selected range of an activation cone, then a controller determines that at least one unintentional force likely influenced the operator use of an input control. In some embodiments, the activation cone has a vertex at zero and a height and radius defined by preselected Phi and Theta values. In other embodiments, the activation cone is frustospherical, with a vertex at zero. It is understood that the activation cone can be alternatively defined according to other well-known conventions. In some embodiments, the boundary of an activation cone is determined using a preselected tolerance or deviation range. In an example, an activation cone includes a slight tilt towards an operator, but the present subject matter is not so limited.

If it is determined that the movement vector is within the activation cone at step 1802, then the method proceeds to step 1803. If it is determined that the movement vector is not within the activation cone at step 1802, then the method proceeds to step 1804.

At step 1803, the method queries whether a magnitude of the movement vector is within a magnitude range. The magnitude of the movement vector is the length of the movement vector. In some embodiments, the length of the movement vector is determined by the value acquisition module 113.

If it is determined that the magnitude of the movement vector is within the magnitude range at step 1803, then the method proceeds to step 1899. If it is determined that the magnitude of the movement vector is not within the magnitude range at step 1803, then the method proceeds to step 1804.

At step 1804, the method sets the confidence level value equal to zero and proceeds to step 1898.

At step 1898, the method exits to step 1699 in FIG. 15 or, optionally, proceeds to step 1607 depicted in FIG. 15 in order to store the movement vector before exiting the method at step 1699.

At step 1899, the method exits. In an example, the method proceeds to step 1606 depicted in FIG. 15 in order to determine the confidence level value.

FIG. 17 illustrates an exemplary adjustment graph 1900 utilized in association with the exemplary method in FIG. 18 to determine the candidate adjustment value according to an embodiment. The determined candidate adjustment value may be subsequently used by the systems and methods disclosed herein to determine the adjusted input control value.

In some embodiments, an adjustment graph optionally includes of two or more adjustment mode blocks, such as blocks 1901-1904. In an example, an adjustment mode block may correspond to a "SUPER ECO" operating mode for a vehicle, such as block 1904, another adjustment mode block may correspond to an "ECO" operating mode for a vehicle, such as block 1903, another adjustment mode block may correspond to a "NORMAL" operating mode for a vehicle, such as block 1902, and another adjustment mode block may correspond to a "POWER" operating mode for a vehicle, such as block 1901. It is understood that the number of adjustment mode blocks can be more or less than utilized in the example, including not utilizing adjustment mode blocks.

In those embodiments utilizing adjustment mode blocks, each adjustment mode block is comprised of one or more adjustment value columns, such as column 1905. In those embodiment not utilizing adjustment mode blocks, the adjustment graph as a whole is comprised of one or more adjustment value columns, such as column 1905.

In some embodiments, an adjustment value column correlates to a range of candidate adjustment values, which other systems and methods disclosed herein may utilize to adjust the input control value. In some embodiments, the values specified in the adjustment value columns are abstract values, such as values ranging from 1-100, which can be mapped to one or more look-up tables. The look-up tables include actual values to be used in subsequently adjusting the input control value. The values in a given look-up table are implementation-specific values, and as such, different implementations can correspond to different look-up tables. Examples of different implementations include, but are not limited to, different types and makes of vehicles and different sampling rates of the input control signals and other detection signals. In other embodiments, the values specified in the adjustment value columns are actual values to be used in subsequently adjusting the input control value. It is understood that the number of adjustment mode blocks, the number of adjustment value columns in each corresponding adjustment mode block, and the range of each adjustment value column shown in the adjustment graph of FIG. 17 is for exemplary purposes only. Adjustment graphs can be configured to be implementation-specific. Adjustment graphs can be further customized to meet desired performance parameters and policy implementations. Other methods for determining a candidate adjustment value, such as without using an adjustment graph, are possible. For example, a confidence level value can be compared against one or more threshold values and the result of the comparison can be utilized as a basis for determining a candidate adjustment value.

An example method of determining the candidate adjustment value utilizing an adjustment graph, such as the adjustment graph 1900, is illustrated in the flowchart of FIG. 18. In an example, the method functions within step 805 of FIG. 8. The method enters at step 2001. At step 2006, the method optionally determines the adjustment mode block. In some embodiments, the method utilizes the adjustment mode value to determine the adjustment mode block, if an adjustment mode value was utilized in a particular embodiment. In an example, the adjustment mode value is used as an array pointer within the adjustment graph to point to the utilized adjustment mode block. Other methods to determine the adjustment mode block are possible. In some embodiments, the adjustment mode value is set to a default value on initialization in step 802 in FIG. 8.

At step 2002 of FIG. 18, to determine an adjustment value column selector value ("AVCSV") the method utilizes the confidence level value determined at step 804 in FIG. 8 and, optionally, other values, including but not limited to historical adjustment value column selector values, such as from a buffer. The AVCSV functions as a pointer within each adjustment mode block or, alternately, within the adjustment graph as a whole if adjustment mode blocks are not utilized, to identify a specific adjustment value column at step 2003. In some embodiments, the adjustment value column selector value represents a value within normalized range, such as between 0 and 100.

In those embodiments not utilizing adjustment mode blocks, each adjustment mode column is uniquely identified by using the adjustment value column selector value. In those embodiments utilizing adjustment mode blocks, each adjustment value column shown in the graph of FIG. 17 is uniquely identified by an adjustment mode block: adjustment value column selector value (AMB:AVCSV) pair. For example, where the adjustment mode block is block 1902 and the adjustment value column selector value is 50, the AMB:AVCSV pair corresponds to the adjustment value column 1905. However, for the same adjustment value column selector value of 50, but a different adjustment mode block 1903, the AMB:AVCSV pair corresponds to the adjustment value column 1906. To clarify, the adjustment graph shown in FIG. 17 does not represent a coordinate system. Each adjustment mode block corresponds to a normalized range of adjustment value column selector values. For example, the adjustment value columns in the adjustment mode block 1901 correspond to the adjustment value column selector values 0-100, the adjustment value columns in the adjustment mode block 1902 correspond to the adjustment value column selector values 0-100, the adjustment value columns in the adjustment mode block 1903 correspond to the adjustment value column selector values 0-100, and the adjustment value columns in the adjustment mode block 1904 correspond to the adjustment value column selector values 0-100. It is the combination of the adjustment mode block and the adjustment value column selector value, the AMB:AVCSV pair, that uniquely identifies one adjustment value column within the adjustment graph.

In some embodiments, the adjustment value column selector value is computed at step 2002 using a weighted average of a combination of the current confidence level value and one or more previous, or historic, values for the adjustment value column selector value, such as from a buffer. In an example, the adjustment value column selector value is computed according to: $AVCSV_{curr} = (CL*WT_{CURR}) + (AVCSV_{[CURR-1]}*WT_{[CURR-1]}) + (AVCSV_{[CURR-2]}*WT_{[CURR-2]}) + (AVCSV_{[CURR-3]}*WT_{[CURR-3]})$, where "WT" refers to a normalized weighted value. Different weighted values can be applied to different historical adjustment value column selector values. The weighted values can be implementation-specific. The current adjustment value column selector value is adjusted from cycle to cycle and is part of an adaptive learning system that utilized the historical adjustment value column selector value. In a first cycle, the adjustment value column selector value can be set to some default value or the adjustment value column selector value can be set using the above formula where the historical adjustment value column selector values are set to zero. Subsequent cycles adjust the adjustment value column selector value from the initial value. In some embodiments, using a weighted average provides a means for smoothing the transition from one adjustment value column to another adjustment value column between cycles. This smoothing function serves to restrict the change in ranges of candidate adjustment values from cycle to cycle. It is understood that alternative weighted average formulas can be used. It is also understood that formulas other than weighted average formulas can be used.

At step 2003, the method determines the adjustment value column by mapping the adjustment mode column selector value determined at step 2002 to a corresponding adjustment value column within the adjustment graph or, alternately, within an adjustment mode block within the adjustment graph if adjustment mode block were implemented. The determined adjustment value column provides a range of candidate adjustment values with which the system may adjust the input control value.

At step 2004, the method utilizes the adjusted value column determined at step 2003 and the confidence level value to determine the candidate adjustment value ("CAV"). In an example, the method can utilize the confidence level value and adjustment value column (CL:AVC) pair as a lookup parameter from a storage medium 2005. The storage medium 2005 returns the corresponding CAV value. This is a low compute resource but storage-heavy implementation.

In another example, not illustrated in FIG. 18, instead of mapping, the method at step 2004 can compute the candidate adjustment value. In an example, the method first determines an adjustment value range ("AVR") of the adjustment value column by determining the difference between the high ($AVL_{HIGH}$) and low ($AVL_{LOW}$) adjustment limit values for the adjustment value column: $AVR = AVL_{HIGH} - AVL_{LOW}$. In some embodiments, the method then computes the candidate adjustment value by multiplying the adjustment value range by the normalized confidence level value within a 0.0-1.0 range and shifting the result by the lowest value in the adjustment value range: $CAV = (AVR*CL) + AVL_{LOW}$. It is understood that alternative formulas can be used to compute the candidate adjustment value.

The method exits at step 2099. In an example, the method proceeds to step 806 depicted in FIG. 8. In some embodiments, the candidate adjustment value and data used to determine the candidate adjustment value are associated together and stored, and used as part of a learning system.

An advantage of the method of FIG. 18 is that, by defining a range of candidate adjustment values, the method can vary the level of aggressiveness when performing adjustments. In this context, aggressiveness refers to how much adjustment is made to an input control value. As applied to the adjustment value column, the range of candidate adjustment values in a specific adjustment value column represent a range of aggressiveness of adjustment. For example, if a selected adjustment value column has an abstract range of 0-0.8, then the input control value can be adjusted somewhere in the range of 0-80%.

In an embodiment, the aggressiveness of the candidate adjustment values within an adjustment value column increases linearly. In other embodiments, such increases are non-linear. In another embodiment, the aggressiveness of candidate adjustment values within an adjustment value column may be symmetrical regardless of the direction of change reflected by the input control value. In still other embodiments, the aggressiveness of candidate adjustment values within an adjustment value column may be asymmetrical depending on the direction of change reflected by the input control value. For example, different candidate adjustment values may be associated with a specific confidence level value depending upon whether foot pressure on an accelerator pedal is being increased or decreased. Such difference in candidate adjustment values may be accomplished by computation or through mapping to one or more data sets, such as a data set for "push" candidate adjustment values and a data set for "release" candidate adjustment values, in an example.

The exact candidate adjustment value is subsequently determined by the CL:AVC pair. In a certain embodiment, as the confidence level value increases, the candidate adjustment value selected from the adjustment value column increases in value, and therefore increases the aggressiveness by which the adjustment is applied to the input control value. In an exemplary embodiment, referring to the adjustment graph of FIG. 17, the aggressiveness afforded by the adjustment value columns in adjustment mode block 1901 is very low because the range of values in each of these adjustment value blocks is from zero to a relatively low number, as exemplified by a short column. In contrast, the aggressiveness afforded by all the adjustment value columns in adjustment mode block 1903 is very high because the high value in the range of values for each adjustment value blocks is relatively high, as exemplified by a top end of each column. The aggressiveness afforded by the adjustment value columns in adjustment mode block 1902 varies as the high value in the range of values varies from adjustment value column to adjustment value column.

The amount of aggressiveness can also be influenced by the sampling rate of the input control signal. For example, at a sampling rate of 20 Hz there are fewer opportunities to adjust than at a sampling rate of 60 Hz, so an implementation operating at 20 Hz may be configured with greater aggressiveness to compensate for the fewer opportunities to adjust. This is reflected in the defined ranges of the adjustment value columns, which can vary based on implementation.

A non-zero value for the low value in a range of candidate adjustment values, such as the adjustment value columns in blocks 1903 and 1904 of FIG. 17, provide a means for dampening the input control signal. Even if it is determined that there is no unintentional force component to the input control signal, such as a confidence level value of zero, some level of dampening can still be applied to the input control signal. This can be used to reduce the effects of longer waveform unintentional forces. This can be also used to reduce intentional changes in the input control signal, such as when an operator over-accelerates a vehicle in a wasteful manner, such as by attempting to accelerate at a rate beyond what the vehicle powertrain can support, in an example.

Another advantage of the method of FIG. 18 is that, by utilizing the current and historical confidence level values and other associated values, the system can rapidly increase or decrease the aggressiveness of adjustments in response to evolving trends, and direction, of changes in the confidence level value over time.

Figure 19:
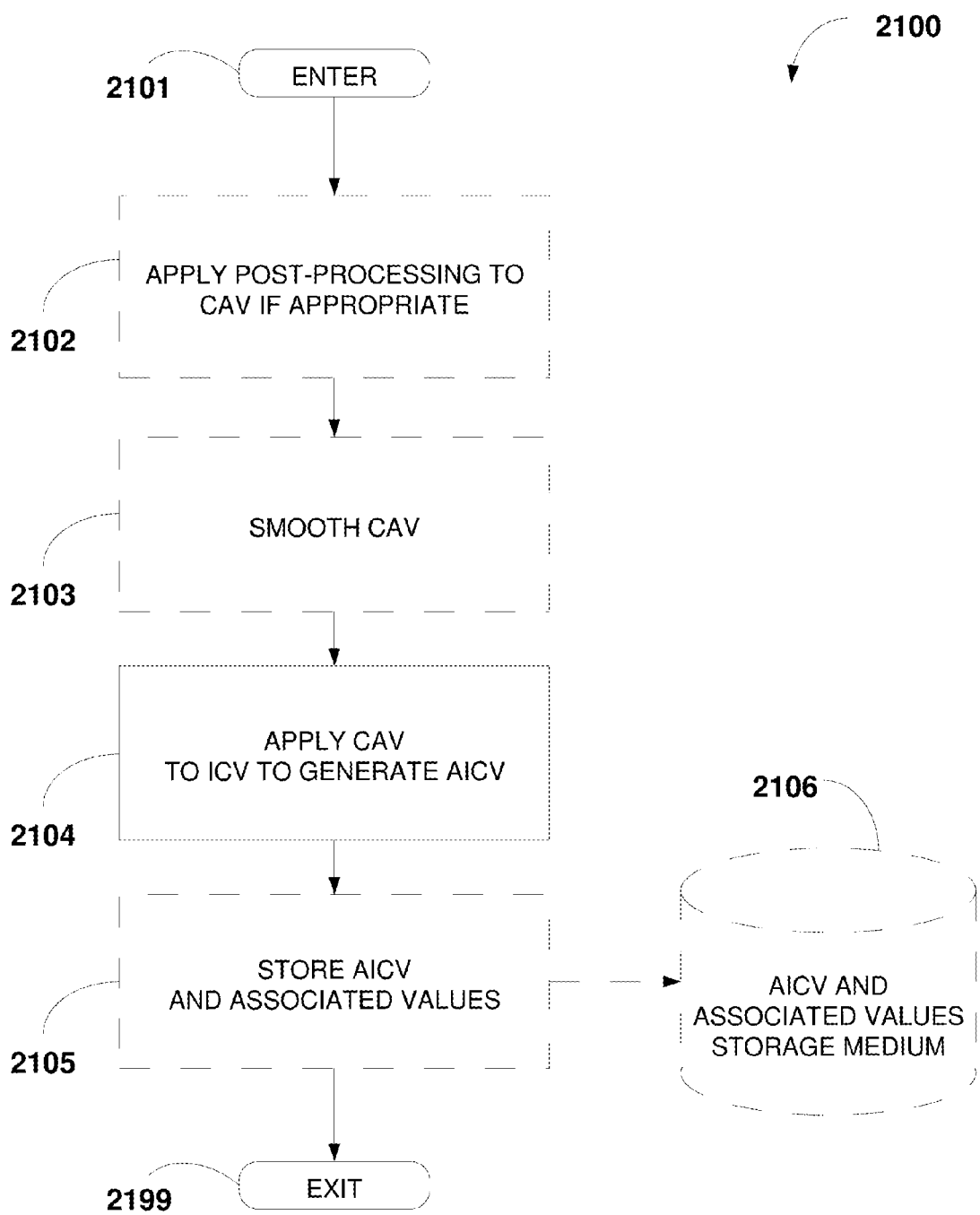
FIG. 19 illustrates a flow diagram depicting a detailed method for determining an adjusted input control value of FIG. 8 utilizing the candidate adjustment value and also, optionally, applying post-processing and smoothing to the candidate adjustment value according to an embodiment.

FIG. 19 illustrates a flowchart of a method for determining an adjusted input control value according to an embodiment. In an example, the method is included within step 806 in FIG. 8. An outcome of this method can be an adjusted input control value that is equal or not equal to the input control value.

Figure 20:
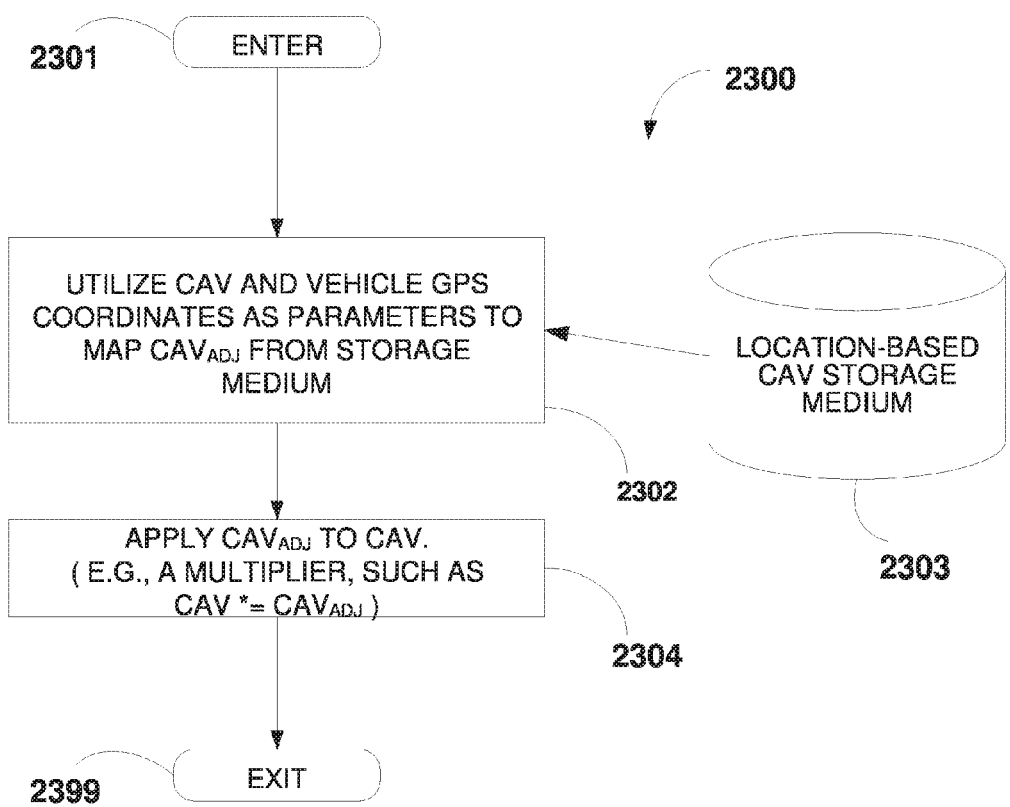
FIG. 20 illustrates a flow diagram depicting a detailed method for utilizing a storage medium with location-based data to post-process the candidate adjustment value of FIG. 18 according to an embodiment.
Figure 21:
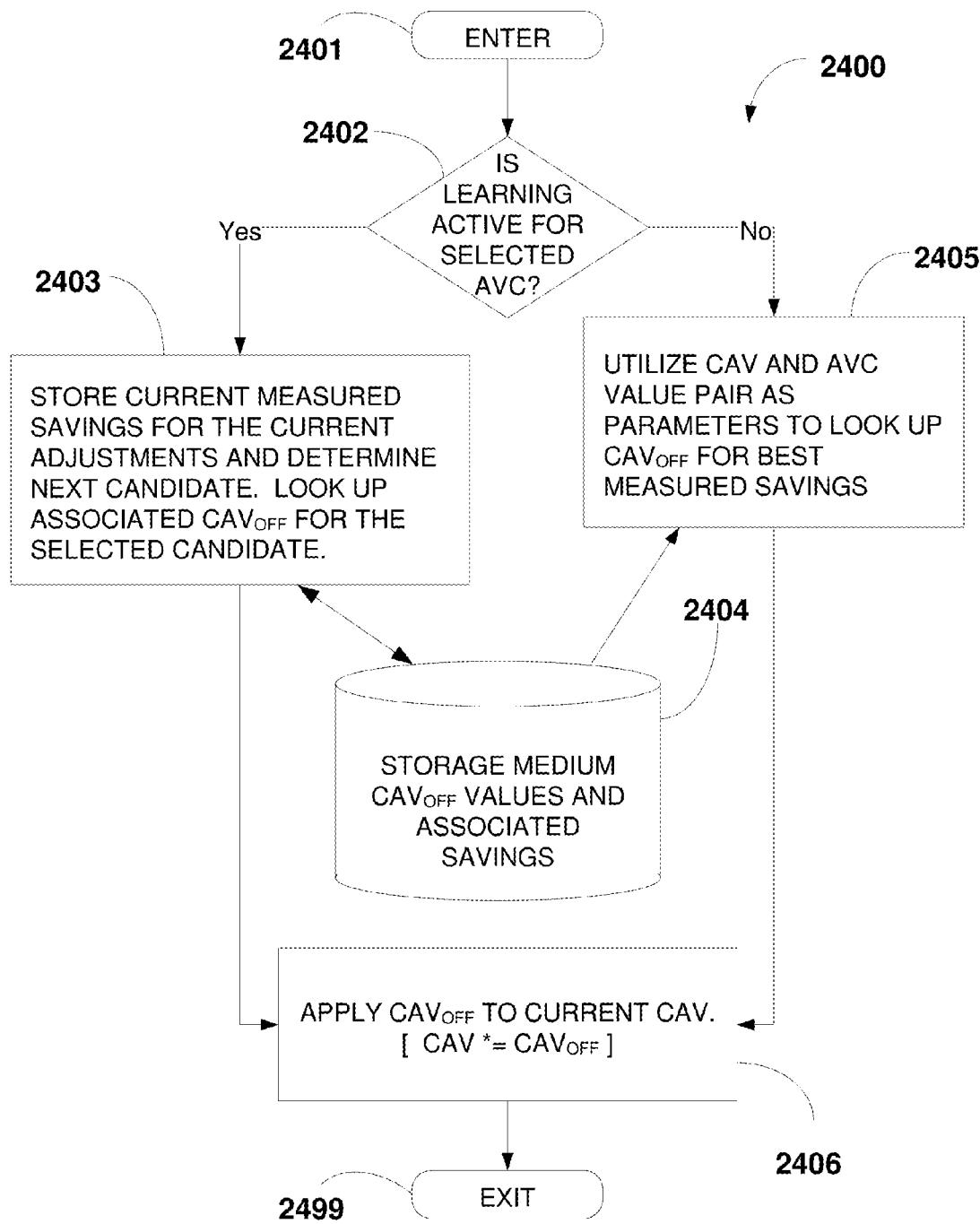
FIG. 21 illustrates a flow diagram depicting a detailed method for utilizing a learning system to post-process the candidate adjustment value of FIG. 18 according to an embodiment.

The method is entered at step 2101. At step 2102, the method may optionally apply post-processing to the candidate adjustment value determined at step 2004 in FIG. 18. In an example, such post-processing may involve replacing or adjusting the candidate adjustment value with values from other systems or methods. In an example, FIG. 20 provides an exemplary post-processing method for adjusting the candidate adjustment value utilizing a value obtained from a storage medium containing location-based adjustment values. In another example, FIG. 21 provides another exemplary post-processing method to compare and/or modify the candidate adjustment value utilizing a storage medium as part of a learning system.

Figure 22:
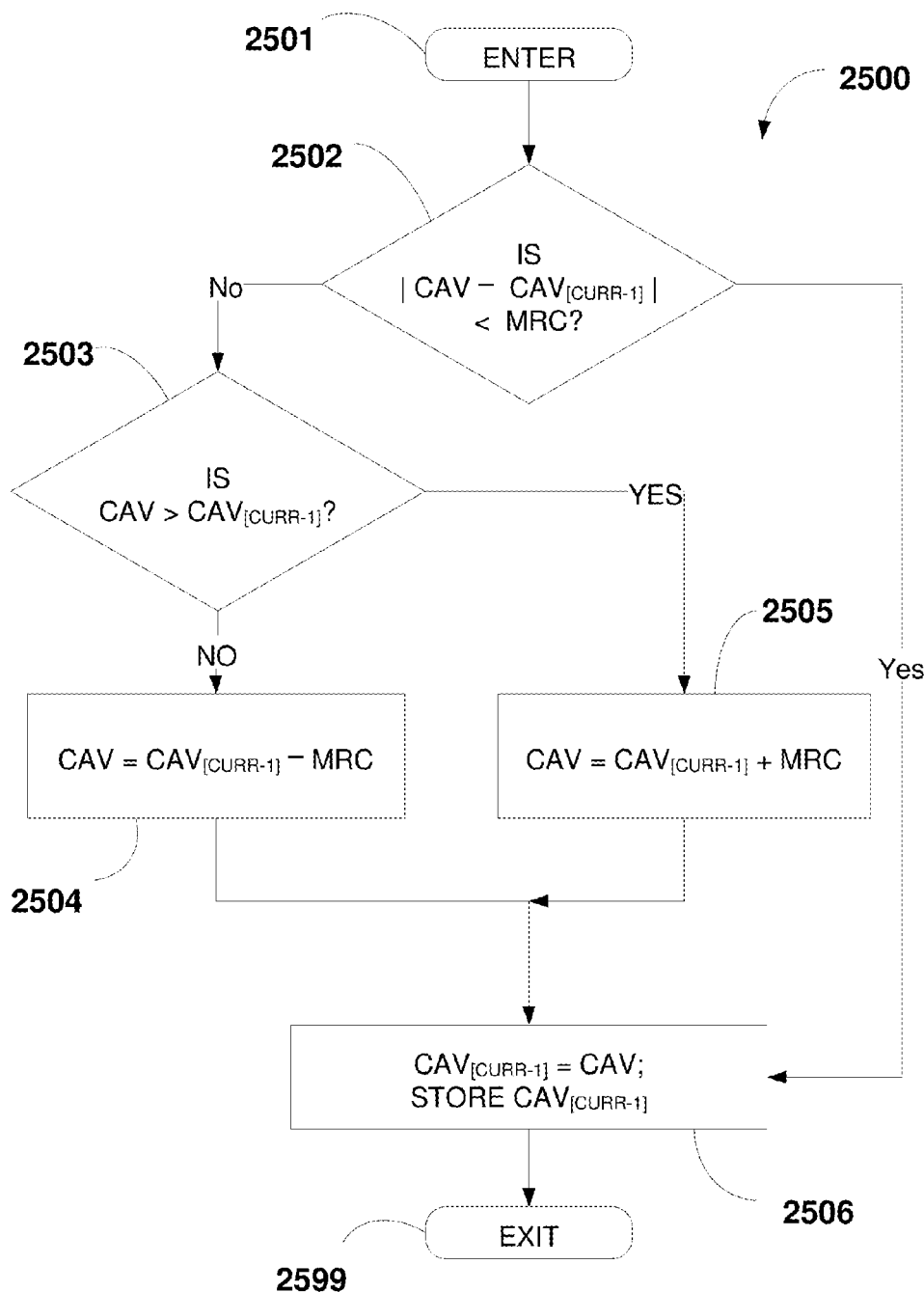
FIG. 22 illustrates a flow diagram depicting a detailed method for smoothing of the candidate adjustment value of FIG. 18 according to an embodiment.

At step 2103, the method may optionally smooth the candidate adjustment value. In an example, the method applies a rate-limiting technique to reduce the rate of change for the candidate adjustment value between any two cycles and, as such, also reduce the rate of adjustment to the input control value between any two cycles. This essentially applies a dampening effect to adjustments from cycle to cycle. In an example, FIG. 22 provides an exemplary method to smooth linearly the candidate adjustment value. Other non-linear smoothing techniques may be used.

At step 2104, the method utilizes the candidate adjustment value and the input control value to determine the adjusted input control value. The outcome of this method is utilized by other systems and methods disclosed herein to communicate the adjusted input control value to the next system or process that uses this value. In an example, FIG. 23 provides an exemplary method to determine the adjusted input control value.

At step 2105, the method optionally stores the AICV, all data utilized in the general method to determine the AICV, and all data associated with the AICV, such as in a storage medium 2106. The AICV and stored data can be subsequently analyzed by a learning system in order to further refine future AICV computations, in an example.

The method exits at step 2199. In an example, the method proceeds to step 807 depicted in FIG. 8.

FIG. 20 illustrates a flowchart of an optional method for post-processing the candidate adjustment value utilizing a storage medium with location-based data according to an embodiment. In an example, the method functions within step 2102 of FIG. 19. The method enters at step 2301. At step 2302, the method utilizes the candidate adjustment value determined at step 805 in FIG. 8 and the vehicle location as parameters to look up a CAV adjustment ("$CAV_{ADJ}$") from a storage medium 2303. In an example, such storage medium contains one or more $CAV_{ADJ}$ associated with one or more geographical ranges or boundaries.

At step 2304, the method applies $CAV_{ADJ}$ to the CAV. In an example, the method sets CAV equal to CAV multiplied by $CAV_{ADJ}$: CAV=CAV*$CAV_{ADJ}$. The method exits at step 2399.

FIG. 21 illustrates a flowchart of another optional method for post-processing the candidate adjustment value according to an embodiment. The optional method uses a learning system to post-process the candidate adjustment value. In an example, the method functions within step 2102 of FIG. 19.

The method enters at step 2401. At step 2402, the method determines whether a learning system is active for the selected adjustment value column, where the adjustment value column is selected in the method of FIG. 18. Such query may be required when a manufacturer implements policies to limit the application of learning to certain adjustment value columns. In an example, a manufacturer de-activates learning for adjustment values columns within a "POWER" mode. If it is determined that the learning system is active at step 2402, then the method proceeds to step 2403. If it is determined that the learning system is not active at step 2402, then the method proceeds to step 2405.

At step 2405, the method utilizes the candidate adjustment value and adjustment value column as parameters to look-up from a storage medium 2404 a candidate adjustment value offset ("$CAV_{OFF}$"). Other inputs may also be utilized for looking up such offset values. In some embodiments, the $CAV_{OFF}$ corresponds to a best-measured energy savings. In an example, the $CAV_{OFF}$ is a value utilized to modify a candidate adjustment value by systems and methods disclosed herein. In an example, such storage medium 2404 contains one or more $CAV_{OFF}$ values and associated fuel savings. The method proceeds to step 2406.

At step 2403, the method acquires the current adjustment results, such as energy consumption, and stores such results in a storage medium containing the currently applied $CAV_{OFF}$ and the associated value entries. In an example, the associated values may contain the RPM and engine block temperature data. In an example, the $CAV_{OFF}$ starts at zero when the learning is initiated and/or revalidated. The storage medium may be in a vehicle or on a network and stores the adjustment results with their associated observed savings values. Such values may be determined through on-the-fly computations assuming the vehicle has sufficient compute power and storage capacity in addition to means to acquire fuel-flow (or power-consumption) and associated data, such as map coordinates in an example. By applying small consecutive variations of $CAV_{OFF}$ with a systematic approach, the system tracks the associated energy consumptions for later utilizations at step 2405. In other embodiments, the adjustment results may be pre-computed in experimental vehicles having access to fuel-flow data and several test routes and then stored on the vehicle or on a network.

The system then proceeds to step 2406. At step 2406, the method applies $CAV_{OFF}$ to CAV in order to determine the post-processed value for CAV. In an example, the method utilizes the $CAV_{OFF}$ value in a scaler operation by multiplying CAV with $CAV_{OFF}$: CAV=CAV*$CAV_{OFF}$. The method exits at step 2499.

FIG. 22 illustrates a flowchart of a method for optionally smoothing the rate of correction between any two cycles according to an embodiment. The outcome of this method is a post-processed CAV that may result in a less significant adjustment to the input control value by systems and methods disclosed herein.

The method is entered at step 2501. At step 2502, the method determines whether the change in the value of CAV between any two cycles exceeds a maximum rate change value ("MRC"). This value may be preset by the manufacturer and/or fleet operator or may be adjusted dynamically in a learning system. In some embodiments, the method queries whether the absolute value for the CAV for the current cycle minus the CAV for the previous cycle ("$CAV_{[CURR-1]}$") is less than the MRC value. If it is determined that the change in CAV is less than the MRC at step 2502, then the method proceeds to step 2506. If it is determined that the change in CAV does is more than the MRC at step 2502, then the method proceeds to step 2503.

At step 2503, the method queries whether the current CAV is greater than $CAV_{[CURR-1]}$. If it is determined YES at step 2503, then the method proceeds to step 2505. If it is determined NO at step 2503, then the method proceeds to step 2504.

At step 2505, the method sets the candidate adjustment value equal to the last candidate adjustment value plus the maximum rate change value: CAV=$CAV_{[CURR-1]}$+MRC. The method proceeds to step 2506.

At step 2504, the method sets the candidate adjustment value equal to the last candidate adjustment value minus the maximum rate change value: CAV=$CAV_{[CURR-1]}$−MRC. The method proceeds to step 2506.

At step 2506, the method sets $CAV_{[CURR-1]}$ equal to CAV and stores the value for $CAV_{[CURR-1]}$, such as in a buffer utilized in subsequent cycles. The method then proceeds to step 2599. At step 2599, the method exits. It is understood that alternative algorithms can be used to compute the CAV.

FIG. 23 illustrates a flowchart of a method of applying the candidate adjustment value to adjust the input control value according to an embodiment. The outcome of the method is an adjusted input control value that is communicated by systems and methods described herein to the next system or process that uses this value. In an example, the method functions within step 2104 of FIG. 19. The method enters at step 2601.

At step 2602, the method determines whether the value for AICV in the previous cycle ("$AICV_{[CURR-1]}$") is greater than the current ICV. If it is determined YES at step 2602, then the method proceeds to step 2604. If it is determined NO at step 2602, then the method proceeds to step 2603.

At step 2603, the method utilizes target approximation to compute the adjusted input control value utilizing the difference between the input control value and the candidate adjustment value, or the post-processed candidate adjustment value if post-processing was optionally performed. In an example, such computation may utilize the formula AICV=(ICV−$AICV_{[CURR-1]}$)*CAV+$AICV_{[CURR-1]}$. The method then proceeds to step 2605. It is understood that alternative algorithms can be used to compute AICV. It is also understood that the specific algorithm used can be implementation specific.

At step 2604, the method utilizes asymmetric adjustment. In an example, such method may be preferred by a manufacturer to adjust for releases in pressure (decelerations) on a vehicle accelerator pedal. In an example, such method maximizes the rate of deceleration by setting the adjusted input control value equal to the input control value without modification: AICV=ICV. It is understood that alternative methods of adjustment can be applied in the case where the last value of AICV is greater than the ICV. The method then proceeds to step 2605.

In an example of symmetric adjustment, at step 2604 the method utilizes target approximation to compute the adjusted input control value utilizing the difference between the input control value and the candidate adjustment value. Such a method may be a better choice for a steering control on an aircraft, where the manufacturer policy seeks equal rates of adjustments in multiple directions. In some embodiments, such computation may utilize the formula $AICV = (AICV_{[CURR-1]} - ICV) * CAV + AICV_{[CURR-1]}$. The method then proceeds to step 2605. It is understood that alternative algorithms can be used to compute AICV. It is also understood that the specific algorithm used can be implementation specific.

At step 2605, the method sets the value for the previous adjusted input control value equal to the current adjusted input control value, such as $AICV_{[CURR-1]} = AICV$. In some embodiments, at step 2604 the method also stores the $AICV_{[CURR-1]}$, such as in a buffer. The method then proceeds to step 2699. At step 2699, the method exits. In an example, the method proceeds to step 2199 depicted in FIG. 19.

The above method and system have been described in both general terms and more specific terms, including a small sample of exemplary applications. In another application, beyond using the input control system and method for dithering, the system and method can also be applied to a process to smooth the rate of acceleration, for example, to apply a software governor, if a vehicle, such as a transit bus, is running early or, contrarily, unleash more horsepower if the vehicle is behind schedule. The system can be highly dynamic, with available power and maximum acceleration rate for each specific transit bus increasing or decreasing just slightly in response to its position at a given time on a coordinate map.

The present application has been described in terms of specific embodiments incorporating details to facilitate the understanding of the principles of construction and operation of the vehicle input control system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of increasing mileage efficiency of a vehicle, the method comprising:
    acquiring an input control signal from an input control mechanism of the vehicle, the input control signal indicative of a position of an accelerator pedal of the vehicle;
    determining a probability value that the input control signal includes a portion attributable to an unintentional force applied to the input control mechanism;
    acquiring one or more different types of detected vehicular force signals from one or more force detection sensors;
    determining a vector value based on the one or more different types of detected vehicular force signals;
    determining a movement vector as a difference between the vector value and a baseline vector value;
    adjusting the probability value based on the movement vector;
    adjusting the input control signal according to the probability value to reduce the portion of the input control signal that is attributable to the unintentional force detected by the one or more force detection sensors; and
    transmitting the adjusted input control signal to an output receiving unit for increasing mileage the vehicle.

2. The method of claim 1 wherein the unintentional force is applied to the input control mechanism by an operator performing an action on an input control mechanism.

3. The method of claim 1 wherein the unintentional force comprises a vehicle-generated force.

4. The method of claim 1 wherein the unintentional force comprises an extra-vehicular force.

5. A method of controlling a vehicle, the method comprising:
    acquiring an input control signal from an input control mechanism of the vehicle, the input control signal indicative of a position of an accelerator pedal of the vehicle;
    determining a probability value that the input control signal includes a portion attributable to an unintentional force applied to the input control mechanism by:
        generating a time-trend range of previous input control signals to determine a predicted input control signal,
        determining a difference between the predicted input control signal and the input control signal, and
        determining the probability value based at least in part on the determined difference between the predicted input control signal and the input control signal;
    adjusting the input control signal according to the probability value to reduce the portion of the input control signal that is attributable to the unintentional force; and
    transmitting the adjusted input control signal to an output receiving unit for controlling the vehicle.

6. The method of claim 5 further comprising acquiring a geographic position of the vehicle, selecting a sub-set of the known stored waveforms corresponding to the geographic position, and comparing the input control signal and previous input control signals to the sub-set of known stored waveforms.

7. The method of claim 5 wherein there is a linear relationship between changes in the probability value and corresponding changes in an amount of adjustment to the input control signal.

8. The method of claim 5 wherein there is a non-linear relationship between changes in the probability value and corresponding changes in an amount of adjustment to the input control signal.

9. The method of claim 5 wherein there is a symmetric relationship between changes in the probability value and corresponding changes in an amount of adjustment to the input control signal.

10. The method of claim 5 wherein there is an asymmetric relationship between changes in the probability value and corresponding changes in an amount of adjustment to the input control signal.

11. A method of controlling acceleration of a vehicle, the method comprising:
    acquiring an input control signal from an input control mechanism of the vehicle, the input control signal indicative of a position of an accelerator pedal of the vehicle;

determining a probability value that the input control signal includes a portion attributable to an unintentional force applied to the input control mechanism, acquiring a vehicular force signal, from a force detection sensor, representing a force reaction by the vehicle;

determining a vector value based on the vehicular force signal;

determining a movement vector as a difference between the vector value and a baseline vector value;

adjusting the probability value based on the movement vector;

adjusting the input control signal according to the probability value to reduce the portion of the input control signal that is attributable to the unintentional force detected by the force detection sensor; and transmitting the adjusted input control signal to a processor of an engine control unit to control acceleration of the vehicle.

12. The method of claim 11 wherein the vehicular force signal is generated by one or more sensors coupled to the vehicle.

13. The method of claim 11 wherein there is a linear relationship between changes in the probability value and corresponding changes in an amount of adjustment to the input control signal.

14. The method of claim 11 wherein there is a non-linear relationship between changes in the probability value and corresponding changes in an amount of adjustment to the input control signal.

15. The method of claim 11 wherein there is a symmetric relationship between changes in the probability value and corresponding changes in an amount of adjustment to the input control signal.

16. The method of claim 11 wherein there is an asymmetric relationship between changes in the probability value and corresponding changes in an amount of adjustment to the input control signal.

17. The method of claim 1 wherein the one or more different types of detected vehicular force signals comprise geographic position data.

18. The method of claim 1 wherein the one or more different types of detected vehicular force signals comprise vehicle speed data.

19. A method of controlling acceleration of a vehicle, the method comprising:

acquiring an input control signal from an input control mechanism of the vehicle, the input control signal indicative of a position of an accelerator pedal related to the vehicle;

determining a probability value that the input control signal includes a portion attributable to an unintentional force applied to the input control mechanism by:

generating a time-trend range of previous input control signals to determine a predicted input control signal, determining a difference between the predicted input control signal and the input control signal, and determining the probability value based at least in part on the determined difference between the predicted input control signal and the input control signal;

adjusting the input control signal according to the probability value to reduce the portion of the input control signal that is attributable to the unintentional force; and transmitting the adjusted input control signal to a processor of an engine control unit to control acceleration of the vehicle.

20. The method of claim 19 wherein there is a linear relationship between changes in the probability value and corresponding changes in an amount of adjustment to the input control signal.

21. The method of claim 19 wherein there is a non-linear relationship between changes in the probability value and corresponding changes in an amount of adjustment to the input control signal.

22. The method of claim 19 wherein there is a symmetric relationship between changes in the probability value and corresponding changes in an amount of adjustment to the input control signal.

23. The method of claim 19 wherein there is an asymmetric relationship between changes in the probability value and corresponding changes in an amount of adjustment to the input control signal.

24. The method of claim 1 wherein adjusting the input control signal comprises determining a mode value corresponding to a mode of operating the vehicle, selecting a candidate adjustment value according to the mode value and the probability value, and applying the candidate adjustment value to the input control signal.

25. The method of claim 24 wherein the mode value is the result of an operator selection.

26. The method of claim 24 wherein the mode value is one of an economy mode, a power mode, or a normal mode.

27. The method of claim 24 wherein the mode value is the result of a system selection determined according to a set of policies.

28. The method of claim 24 wherein the mode value is the result of a combination of an operator selection and a system selection determined according to a set of policies.

29. The method of claim 1 wherein there is a linear relationship between changes in the probability value and corresponding changes in an amount of adjustment to the input control signal.

30. The method of claim 1 wherein there is a non-linear relationship between changes in the probability value and corresponding changes in an amount of adjustment to the input control signal.

31. The method of claim 1 wherein there is a symmetric relationship between changes in the probability value and corresponding changes in an amount of adjustment to the input control signal.

32. The method of claim 1 wherein there is an asymmetric relationship between changes in the probability value and corresponding changes in an amount of adjustment to the input control signal.

33. The method of claim 1 wherein determining the probability value comprises acquiring data from a source external to the vehicle and applying the acquired data to determine the probability value.

34. The method of claim 1 wherein adjusting the input control signal comprises generating an adjusted input control value, and the method further comprises smoothing a rate of correction if a difference between the adjusted input control value and an adjusted input control value from a preceding cycle is greater than a maximum rate of correction threshold value.

35. The method of claim 1 further comprising storing data used to determine the probability value and data used to adjust the input control signal in a storage medium, wherein the stored data is to be used in determining a probability value corresponding to subsequent input control signals and adjusting the subsequent input control signals, thereby forming a learning system.

36. An apparatus comprising:
a memory configured to store an input control signal received from an input control mechanism, the input control signal indicative of a position of an accelerator pedal of the vehicle; and
a processor coupled to the memory, the processor comprising program instructions configured to:
  determine a probability value that the input control signal includes a portion attributable to an unintentional force applied to the input control mechanism,
  receive a vehicular force signal, from a force detection sensor, indicative of a measured force,
  determine a vector value based on the received vehicular force signal,
  determine a movement vector as a difference between the vector value and a baseline vector value,
  adjust the probability value based on the movement vector,
  adjust the input control signal according to the probability value to reduce the portion of the input control signal that is attributable to the unintentional force detected by the force detection sensor, and
  transmit the adjusted input control signal.

37. The method of claim 1 wherein at least one of said one or more different types of detected vehicular force signals represents a predicted vehicular force.

38. The apparatus of claim 36 wherein at least one of said one or more different types of detected vehicular force signals represents a predicted vehicular force.

39. The apparatus of claim 36 wherein the memory and the processor are included within an engine control unit of the vehicle.

* * * * *